(12) United States Patent
Walker et al.

(10) Patent No.: US 7,436,750 B2
(45) Date of Patent: Oct. 14, 2008

(54) OPTICAL STORAGE WITH ULTRA HIGH STORAGE CAPACITY

(75) Inventors: Edwin P. Walker, Makawao, HI (US); Yi Zhang, San Diego, CA (US); Yoshinao Taketomi, San Diego, CA (US)

(73) Assignee: Call/Recall Inc., San Diego, CA (US)

( * ) Notice: Subject to any disclaimer, the term of this patent is extended or adjusted under 35 U.S.C. 154(b) by 608 days.

(21) Appl. No.: 10/868,742

(22) Filed: Jun. 14, 2004

(65) Prior Publication Data

US 2004/0257962 A1 Dec. 23, 2004

Related U.S. Application Data

(60) Provisional application No. 60/480,156, filed on Jun. 19, 2003.

(51) Int. Cl.
*G11B 7/00* (2006.01)
(52) U.S. Cl. ............................ 369/112.23; 369/112.02; 369/112.03
(58) Field of Classification Search ............ 369/112.23, 369/112.02, 112.03, 112.18, 112.21, 112.08, 369/112.05, 112.01, 44.37, 44.23, 44.32
See application file for complete search history.

(56) References Cited

U.S. PATENT DOCUMENTS

| | | | |
|---|---|---|---|
| 6,084,846 A | 7/2000 | Jordache et al. | |
| 6,413,680 B1 | 7/2002 | Watanabe et al. | |
| 7,126,901 B2 * | 10/2006 | Iwasaki et al. | 369/112.02 |

FOREIGN PATENT DOCUMENTS

JP 11250496 9/1999

OTHER PUBLICATIONS

Hirota, Kusato et al., "Near-Field Phase Change Optical Recording Using a GaP Hemispherical Lens", Jpn. J. Appl. Phys. vol. 39 (2000), pp. 968-972.
Knight, Gordon, "TeraStor's Near-Field Recording", presented at THIC meeting in San Mateo, CA, Jul. 22-23, 1998.

* cited by examiner

*Primary Examiner*—Ali Neyzari
(74) *Attorney, Agent, or Firm*—O'Melveny & Myers LLP

(57) ABSTRACT

Systems, materials, and methods for increasing the storage capacity of optical recording media are provided. In one aspect, the systems of the present invention take advantage of high NA optics to realize ultra high storage capacity. In another aspect, the systems of the present invention include the use of a liquid interface between the recording medium and a liquid interface singlet objective lens to increase storage capacity. The invention also provides for a material system that allows shorter wavelengths to be used for recording and readout. Further, the invention provides for recording methods wherein the wavelength for recording to a medium is longer than the wavelength for reading from the medium. Additionally, the invention includes a multilayer structure for recording media that increases storage capacity. In another aspect of the present invention, high NA optics and related systems and methods are utilized to increase the storage capacity of optical storage systems.

32 Claims, 35 Drawing Sheets

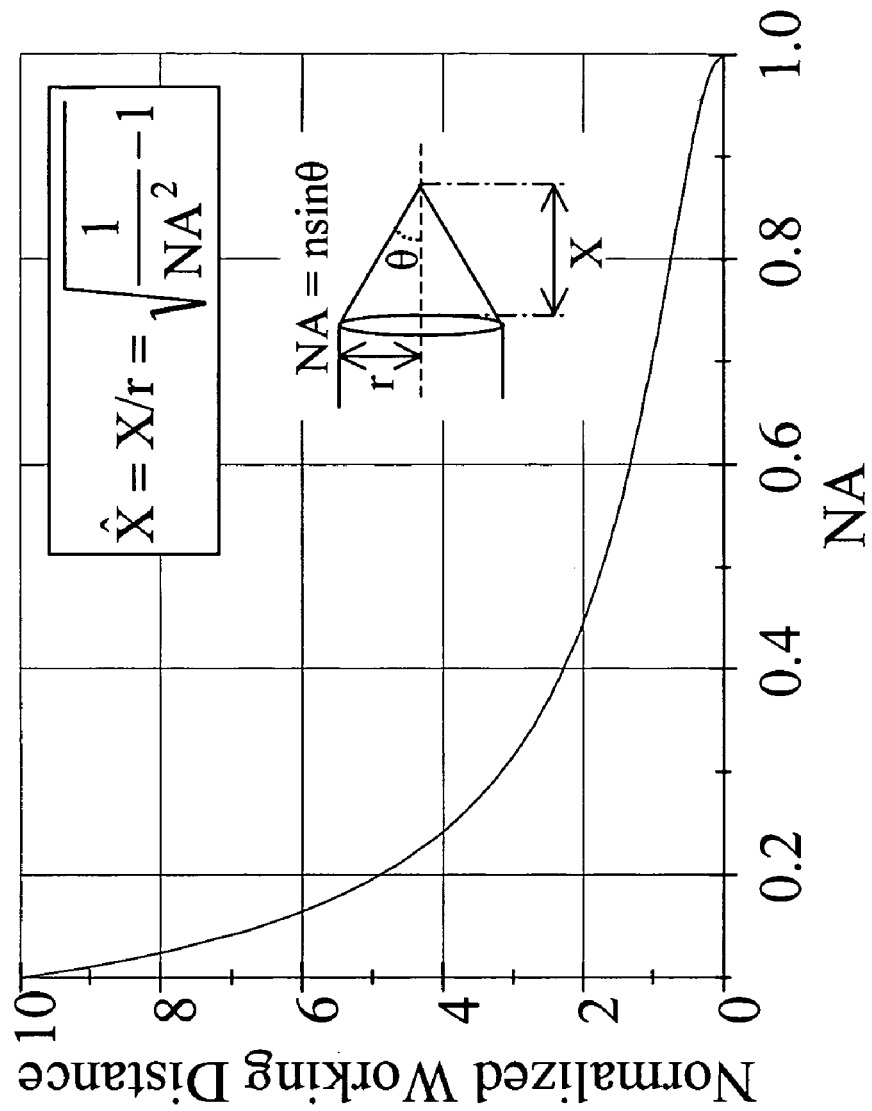
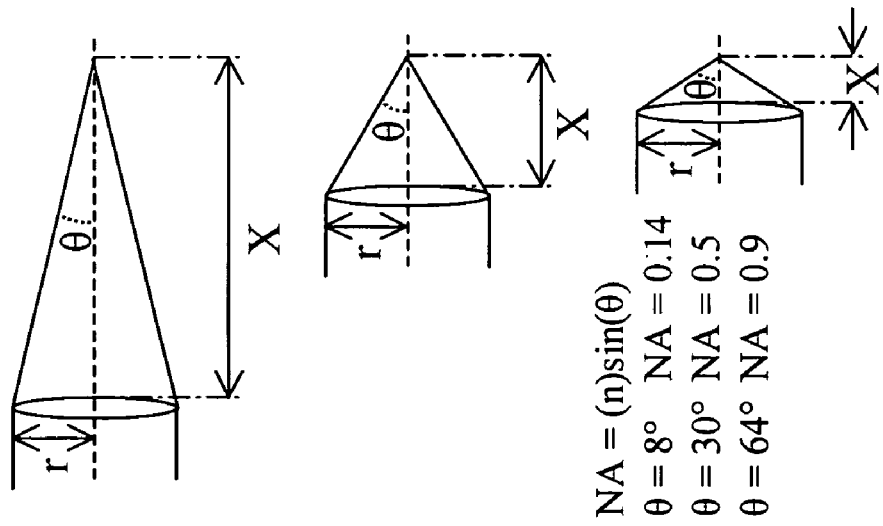
Figure 3

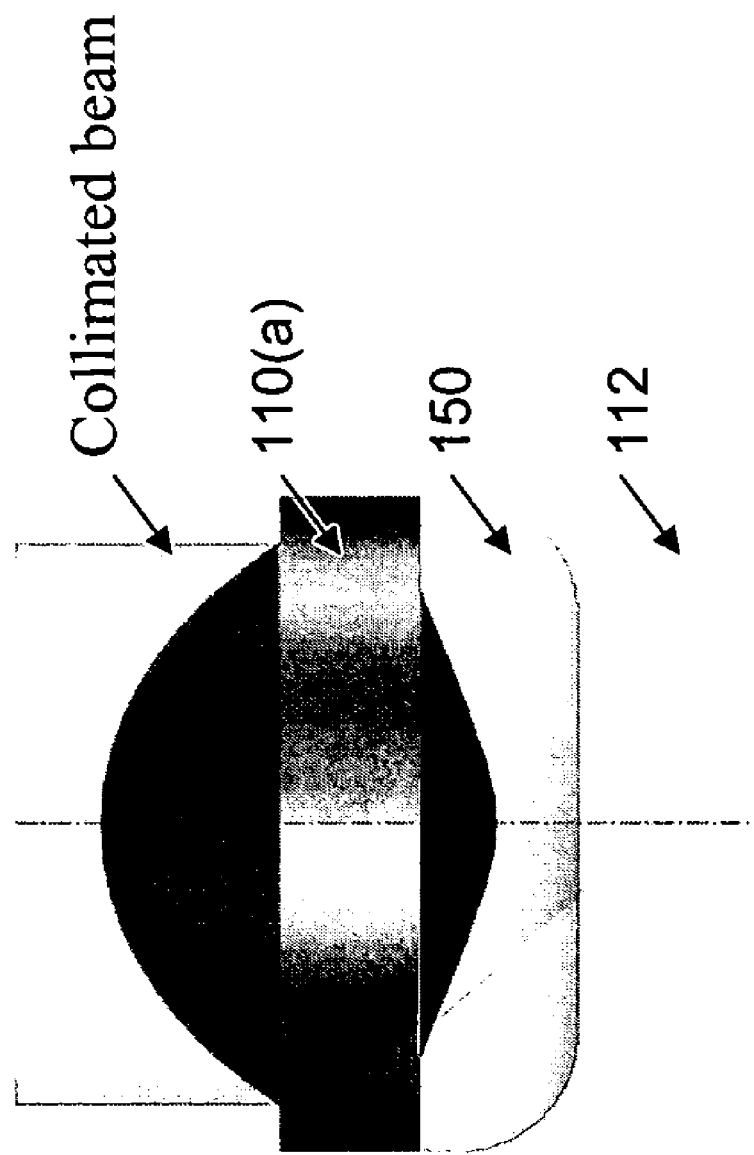

|  | surface 1 | surface 2 |
|---|---|---|
| Radius of curvature | 2.259522E+00 | -1.313318E+00 |
| Conic coefficient | -3.640781E-01 | -6.185471E+00 |
| 4th order coefficient | 4.592782E-05 | 1.316387E-02 |
| 6th order coefficient | -1.944167E-04 | -1.195700E-03 |

| | |
|---|---|
| Center thickness | 2.8mm |
| Design wavelength | 532nm |
| Glass index | 1.85 |
| Liquid index | 1.582 |
| Disk index | 1.592 |
| Working distance | 1.47mm |
| Numerical aperture | 1.0 |

Figure 7(b)

|  | surface 1 | surface 2 |
|---|---|---|
| Radius of curvature | 2.046669E+00 | -4.196953E+00 |
| Conic coefficient | -3.503057E-01 | -8.839236E+01 |
| 4th order coefficient | 2.059098E-04 | 2.495447E-02 |
| 6th order coefficient | -2.170557E-04 | -2.612869E-03 |

| | |
|---|---|
| Center thickness | 2.8mm |
| Design wavelength | 532nm |
| Glass index | 1.85 |
| Liquid index | 1.3 |
| Disk index | 1.31 |
| Working distance | 1.04mm |
| Numerical aperture | 1.0 |

Figure 7(c)

|  | surface 1 | surface 2 |
|---|---|---|
| Radius of curvature | 2.075155E+00 | -3.604207E+00 |
| Conic coefficient | -3.538766E-01 | -5.702240E+01 |
| 4th order coefficient | 1.973757E-04 | 2.228891E-02 |
| 6th order coefficient | -1.984652E-04 | -2.315999E-03 |

| | |
|---|---|
| Center thickness | 2.8mm |
| Design wavelength | 532nm |
| Glass index | 1.85 |
| Liquid index | 1.33 |
| Disk index | 1.34 |
| Working distance | 1.09mm |
| Numerical aperture | 1.0 |

Figure 7(d)

|  | surface 1 | surface 2 |
|---|---|---|
| Radius of curvature | 2.202377E+00 | -1.924346E+00 |
| Conic coefficient | -1.924346E+00 | -1.214156E+01 |
| 4th order coefficient | 8.365997E-05 | 1.520034E-02 |
| 6th order coefficient | -1.714382E-04 | -1.4576639E-03 |

| | |
|---|---|
| Center thickness | 2.8mm |
| Design wavelength | 532nm |
| Glass index | 1.85 |
| Liquid index | 1.485 |
| Disk index | 1.495 |
| Working distance | 1.33mm |
| Numerical aperture | 1.0 |

Figure 7(e)

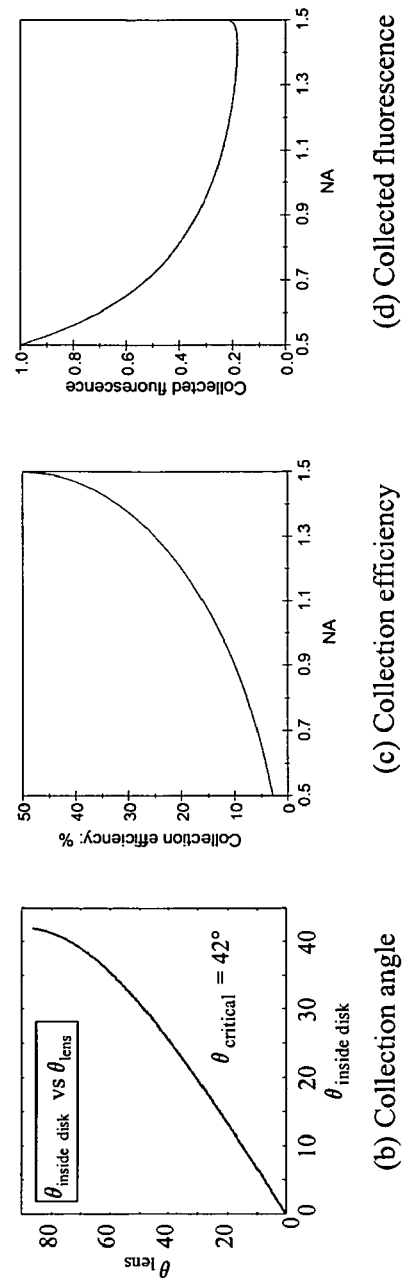
(b) Collection angle    Figure 17(b)
(c) Collection efficiency    Figure 17(c)
(d) Collected fluorescence    Figure 17(d)
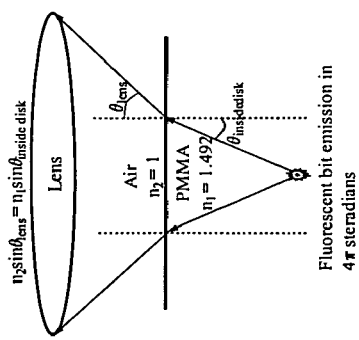
(a) Fluorescence collection    Figure 17(a)

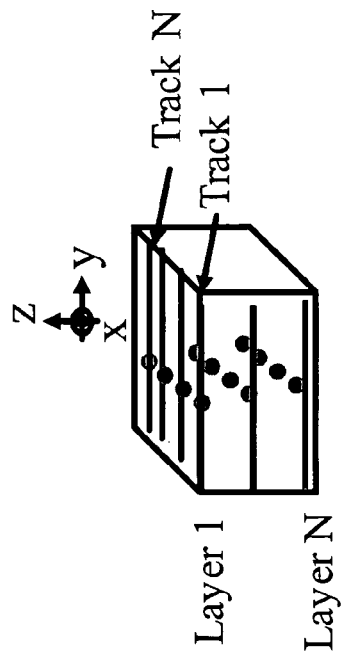
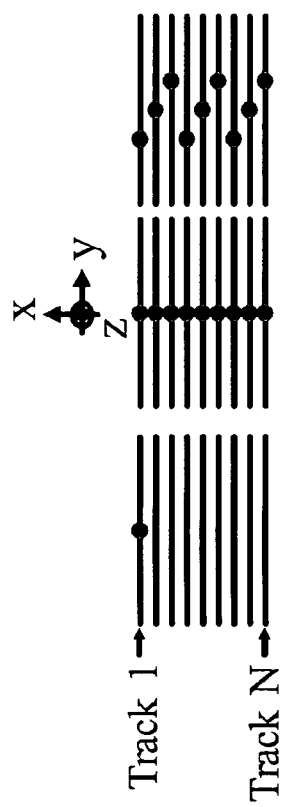
Figure 18(a)  Figure 18(b)  Figure 18(c)
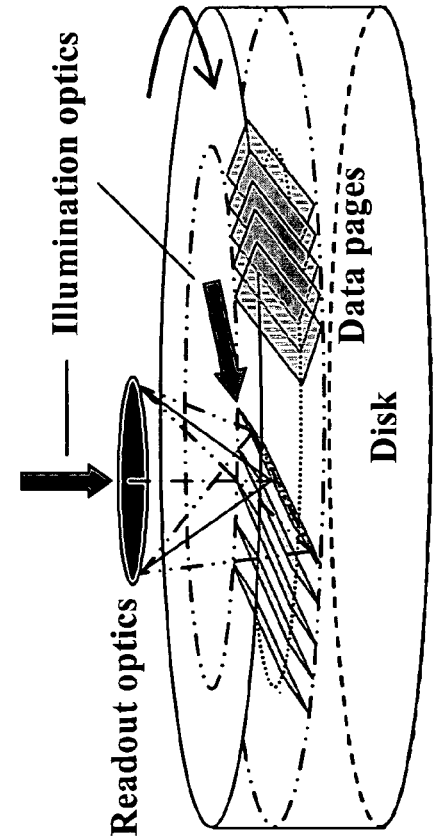
Figure 19

OPTICAL STORAGE WITH ULTRA HIGH STORAGE CAPACITY

CROSS-REFERENCE TO RELATED APPLICATIONS

This application claims the benefit of U.S. Provisional Application No. 60/480,156, filed Jun. 19, 2003, the disclosure of which is expressly incorporated by reference.

STATEMENT REGARDING FEDERALLY SPONSORED RESEARCH OR DEVELOPMENT

The U.S. Government has a paid-up license to certain aspects of this invention and the right in limited circumstances to require the patent owner to license those aspects to others on reasonable terms as provided for by the terms of DAAD19-03-C-0136 awarded by the U.S. Army Research Office.

FIELD OF THE INVENTION

The present invention relates generally to methods and systems for recording and reading data, and more particularly to recording and reading data using methods and systems that enable optical storage with ultra high storage capacity.

BACKGROUND

The majority of today's military, industrial, medical, and entertainment applications now process image rich data, dramatically increasing the demand for storage capacity, data transfer rates, and access times. With more applications requiring larger amounts of storage capacity, a gap between required storage capacity and existing storage capacity has developed. For example, a digital versatile disk (DVD) has a capacity of 9.7 GB, whereas an uncompressed high definition television or video (HDTV, HDV) program may require close to 60 GB, and potentially over 100 GB, of data. Accordingly, technological advances are beginning to outpace available storage media.

The disparity in storage capacity in optical storage, in particular, and in secondary storage, in general, is of significant concern. Military and commercial applications previously found only in the realm of supercomputers are now rapidly moving to the desktop and in the home. As a result, there is a growing need for secondary removable storage systems capable of providing fast data transfer rates and access times along with ease of transport for large data files. Optical disk media may be the most cost effective random access means of providing high capacity, high reliability removable storage. As the demand for high capacity storage and fast data transfer rates increases, the storage/processor data transfer bottleneck is rapidly moving closer to the storage media. Therefore, there is a need to increase storage capacity and enhance the data transfer rate of random access high capacity optical storage systems.

Next generation multimedia applications, including training, telemedicine, multi-sensor visualization, and weapons simulation, also need "firehose" access to massive data storage. New microprocessor system architectures and input/output interfaces to provide these connections are becoming available. Interfacing these multimedia applications with data storage systems capable of Gbit/s throughput is now a possibility. For example, multi-fiber networking technologies including 10 G Ethernet are emerging that offer additional bandwidth to and-from storage systems over SAN, LAN, and other high speed networks. Given the 11 Mbit/s transfer rates of current typical to high capacity storage systems, such as DVD storage systems, there is a need to bridge the widening gap between network speeds and transfer rates of storage systems.

Furthermore, military reconnaissance and homeland security systems may require low cost ultra high capacity, on the order of TB/disk, random access removable media capable of high data access rates, e.g., >100 Mbit/s, both for recording and read out to satisfy data streams from multiple sensors, and to provide fast data streams to drive fast parallel search algorithms on the stored data. Historically, engineers have been able to increase the readout and recording data rates for optical disks less than 5% per year. Therefore, it is unlikely that DVD-based systems will be able to satisfy the high data rates required by the aforementioned applications. Magnetic digital tapes are also unlikely to be able to satisfy the above applications since, while they provide very high data rates and capacities, magnetic digital tapes lack random access, thereby making them incompatible with performing fast searches on stored data. Finally, traditional magnetic hard drives provide capacity and reasonably fast data access rates, but are not removable. Removability is, however, critical for image and video processing applications to be implemented at reasonable costs.

Accordingly, a system capable of recording large quantities of data that may be rapidly and randomly accessed is needed.

SUMMARY OF THE INVENTION

The present invention relates to methods and systems that provide for a low cost ultra high capacity optical disk storage media and systems that can record and be read using low cost laser diodes within a system preferably operating with very high data rates of >300 Mbit/s, and fast access times of ~200 ms.

The inventors have evaluated the performance potentials of combining high numerical aperture (NA) optics with two-photon volumetric data recording approaches to achieve ultra high capacity per disk, on the level of TBs per disk. Confining recording photons in both time and space dimensions enables much higher two-photon recording efficiency boosting capacity and/or recording rates while also more importantly making the overall approach cost effective than what is currently known in the art.

In a first aspect of the present invention, an optical storage system is provided. The optical storage system may include an objective lens and a recording medium designed to receive recording and readout beams that are transmitted through the objective lens. The system preferably includes a liquid gap that couples the objective lens to the recording medium in order to maintain a continuous interface between the objective lens and the recording medium. A recording laser generates a recording beam that is transmitted through the objective lens and to the recording medium. A readout laser generates a readout beam that is transmitted through the objective lens and to the recording medium, and the recording medium emits fluorescence after contact with the readout beam. A detector receives the fluorescence from the recording medium.

In a second aspect of the present invention, an optical storage system is provided. The optical storage system includes a liquid interface singlet objective lens and a recording medium. The recording medium is designed for recording by a recording beam of less than 500 nm and readout by a readout beam of less than 500 nm. The readout beam is of a shorter wavelength than the recording beam. Additionally, the recording medium is composed of a plurality of active layers alternating with a plurality of buffer layers. A liquid gap is provided to maintain a continuous interface between the objective lens and the recording medium. An optics holder may also be provided and disposed around the objective lens and in contact with the liquid gap. A recording laser provides a recording beam, a readout laser provides a readout beam, and a detector is included to receive fluorescence emitted from the recording medium.

In a third aspect of the present invention, a method of recording to and reading from a recording medium is provided. A recording beam of a first wavelength is used to record data on the recording medium, and a readout beam of a second wavelength is used to read data from the recording medium. With this method, the readout beam is a shorter wavelength than the recording beam.

In a fourth aspect of the present invention, a recording medium is provided. The recording medium is composed of a plurality of active layers and a plurality of buffer layers, with the buffer layers alternating with the active layers so that each active layer is disposed between two buffer layers. A recording beam of a first wavelength may be applied to the recording medium to record data, and a readout beam of a second wavelength may be applied to the recording medium to read data. Preferably, the recording beam has a longer wavelength than the readout beam.

These and other aspects, objects, and features of the present invention will be appreciated upon consideration of the following drawings and detailed description.

BRIEF DESCRIPTION OF THE FIGURES

FIG. 3 illustrates a plot of objective lens working distance vs. NA.

FIG. 7(a) is a schematic diagram of a custom lens of the present invention.

FIG. 7(b) is a table showing one set of exemplary design parameters for the custom lens of FIG. 7(a).

FIG. 7(c) is a table showing additional exemplary design parameters for the custom lens of FIG. 7(a).

FIG. 7(d) is a table showing another set of exemplary design parameters for the custom lens shown in FIG. 7(a).

FIG. 7(e) is a table showing other exemplary design parameters for the custom lens of FIG. 7(a).

FIGS. 17(a)-(d) illustrate fluorescence collection, collection angle, collection efficiency, and collected fluorescence, respectively.

FIG. 18(a) illustrates a serial readout of a single data channel.

FIGS. 18(b)-(c) illustrate parallel readouts of 1×N data channels.

FIG. 18(d) illustrates a parallel readout of M×N data channels.

FIG. 19 illustrates a page oriented 3-D parallel readout in a volumetric optical data storage system.

DETAILED DESCRIPTION

The present invention represents the inventors' research efforts regarding the influence of the numerical aperture of the recording and readout optics on two-photon recorded 3-D multi-layer optical disk storage systems, and increasing the storage capacity of two-photon optical storage systems. The inventors have shown that recording by two-photon absorption using a high NA objective lens and the methods and systems of the present invention greatly increase the volumetric density of recording media while reducing the recording laser power requirements (and its cost and footprint) for a given recording speed when compared to currently known systems and methods. For example, using a high NA decreases areal bit size while only modestly reducing the total amount of fluorescent emissions received at the detector. Accordingly, the present invention provides for a bit-wise 3D optical storage solution preferably using a combination of high NA optics, novel materials, and novel media structures.

Figure 1:
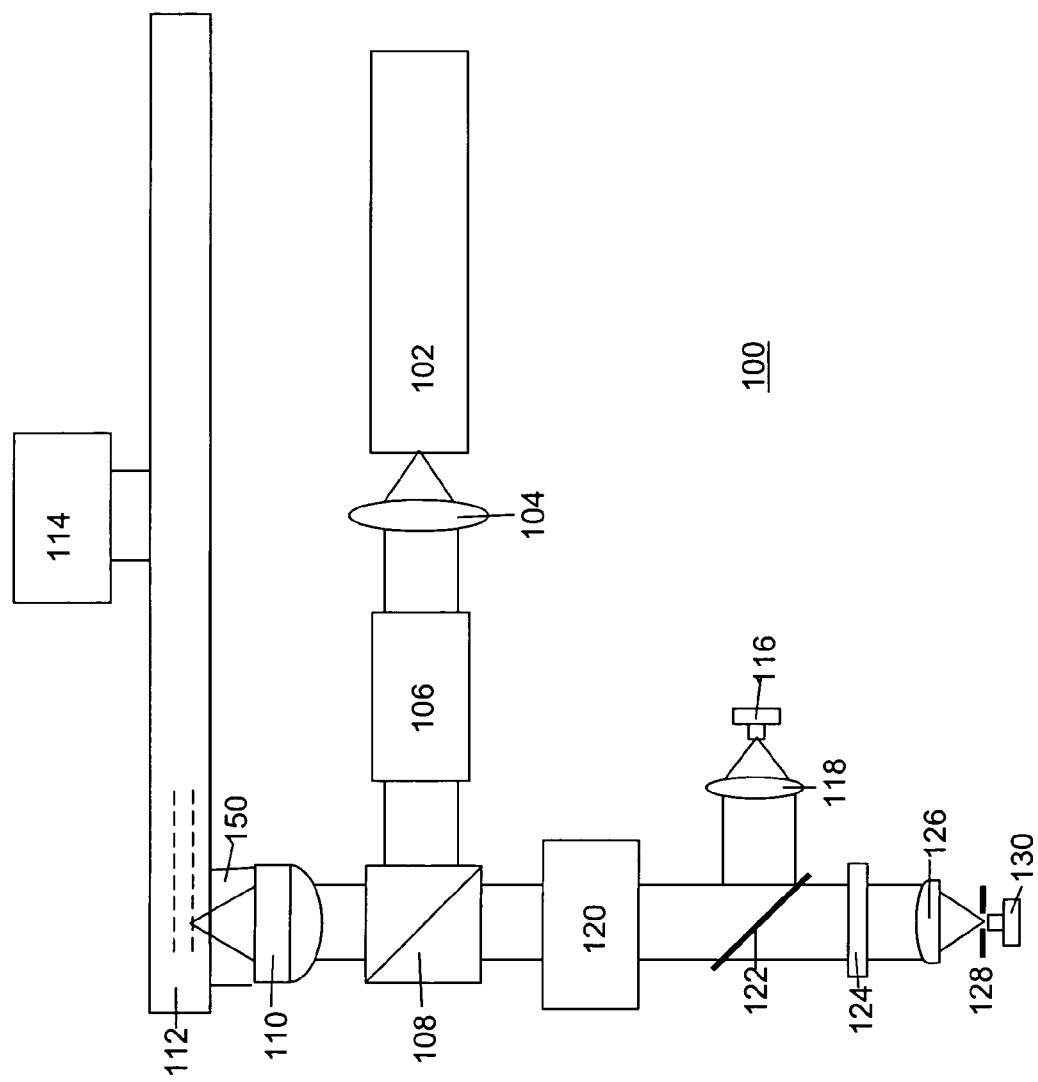
FIG. 1 is a schematic diagram of an embodiment of the system of the present invention.

FIG. 1 is a schematic diagram of one embodiment of a system 100 of the present invention. To record data onto a recording medium 112, which may be, e.g., a disk, the system 100 includes a recording laser 102. The recording laser 102 may be a 532 nm, a 460 nm, or other laser capable of generating a suitable wavelength laser beam depending on the media that is used with the system 100. Additionally, a modulator (not shown) may be included with the system 100 and used to modulate the recording laser beam from the recording laser 102. The modulator may be an acousto-optics modulator. To begin the recording process, the recording laser 102 generates a laser beam that is collimated by a first lens 104 to produce a collimated recording laser beam. Preferably, the collimated recording laser beam is then directed through a first spherical aberration compensator 106 ("SAC1"). The SAC1 106 is used to compensate for any spherical aberrations that may arise due to different recording depths. The SAC1 106 may be implemented using a suitable component such as, e.g., a telescope, a liquid crystal, a fluid lens, a phase plate, or a combination of the aforementioned components. Next, the collimated recording laser beam is transmitted to a first dichroic beam splitter 108 ("DBS1"). The DBS1 108 is used to reflect the collimated recording laser beam towards an objective lens 110, and also to later transmit a readout laser beam towards the objective lens 110 and fluorescence towards a detector 130. Here, the DBS1 108 reflects the collimated recording laser beam towards the objective lens 110. The objective lens 110 may be any suitable lens, such as, e.g., a dry lens, a liquid immersion lens, the liquid interface singlet lenses described herein, and the like. In one embodiment, for example, the objective lens 110 is an aspherical singlet that may be glass or plastic. To adjust the objective lens 110, an optics holder 158, lens holder 151, and actuator 153 are provided. These components are not shown in FIG. 1 but are shown in other figures discussed in further detail herein.

After receiving the collimated recording laser beam, the objective lens 110 focuses the collimated recording laser beam inside the recording medium 112 in order to record data onto the recording medium 112. The recording laser beam may be focused at a range of recording depths within the recording medium 112. The recording medium 112 is preferably 2-photon media that has either a uniform or a multi-layer structure that is described herein. In one embodiment, the recording medium 112 is plastic, and more specifically molded plastic. In another embodiment, the recording medium 112 is a hybrid of plastic placed or formed on a glass substrate. The recording medium 112 is also coupled to a spindle 114 that controls the rate of rotation of the recording medium 112.

In one embodiment of the system 100, particularly in an embodiment using a liquid immersion lens or a liquid interface singlet lens for the objective lens 110, the SAC1 106 may optionally be removed from the system 100 if the refractive indices of the recording medium 112 and liquid placed between the objective lens 110 and the recording medium 112 are substantially matched.

To read data from the recording medium 112, the system 100 includes a readout laser 116. The readout laser 116 may be a 635 nm, a 405 nm, or other laser capable of generating a suitable wavelength laser beam depending on the media that is used with the system 100. The readout laser 116 generates a laser beam that is collimated by a second lens 118. The collimated readout laser beam is then directed through a second dichroic beam splitter 122 ("DBS2"), which reflects the collimated readout laser beam towards the objective lens 110. The DBS2 122 is also used to direct fluorescence towards the detector 130. Preferably, the collimated readout laser beam is next directed through a second spherical aberration compensator 120 ("SAC2"). In a similar fashion as with SAC1 106, SAC2 120 is used to compensate for any spherical aberrations that may arise due to different recording depths. SAC2 120 may be a telescope, liquid crystal, fluid lens, phase plate, or a combination of these components. The collimated readout laser beam next passes through the DBS1 108 and is directed to the objective lens 110. The objective lens 110 focuses the collimated readout laser beam on a desired recorded track inside the recording medium 112.

The focused collimated readout laser beam excites the recording medium, thereby causing the recording medium 112 to emit fluorescence from the recorded track. The emitted fluorescence travels back through the objective lens 110, the DBS1 108, the SAC2 120, and the DBS2 122.

Next, the emitted fluorescence passes through a diffractive optical element 124 ("DOE"). The DOE 124 is a component that is designed to compensate for any chromatic aberration that may be present after propagation through the refractive glass elements due to the extended wavelength bandwidth of the emitted fluorescence. After being corrected for any chromatic aberrations by the DOE 124, the emitted fluorescence is focused by a second objective lens 126. The second objective lens 126 is preferably an objective lens used to collect the emitted fluorescence and focus the fluorescence onto the detector 130. Preferably, the second objective lens 126 focuses the emitted fluorescence through a confocal pinhole 128 that is placed on the focal plane of the second objective lens 126. The confocal pinhole 128 is preferably a few microns in diameter and is used to help decrease interlayer and intertrack crosstalk and to improve the readout signal quality from the recording medium 112. The emitted fluorescence is directed to the detector 130, which may be a photomultiplier tube ("PMT"), avalanche photo diode ("APD"), or other high sensitivity photo detector.

As with the SAC1 106, in an alternative embodiment of the system 100, especially when using a liquid immersion lens or a liquid interface singlet lens for the objective lens 110, the SAC2 120 may optionally be removed from the system 100 if the refractive indices of the recording medium 112 and liquid placed between the objective lens 110 are matched.

The inventors have developed models to determine the data bit size with respect to the NA of the recording optics. The inventors initially begin with a model to describe the bit shape, then consider the areal and axial dimensions of the bit to determine the overall recorded spot dimensions. This analysis ultimately leads to a projection of total disk capacity vs. NA.

In the recording, the excited molecular distribution can simply be considered to be proportional to the square of the irradiance distribution of the recording laser beam. The recorded bit shape can be modeled as a Gaussian-shaped distribution through focus where the recording laser beam Irradiance distribution, I(x,y,z) is given by, $$I(x, y, z) = \frac{I_0}{\omega_0^2 \left[1 + \left(\frac{\lambda z}{n\pi\omega_0^2}\right)^2\right]} \exp\left\{\frac{-2(x^2 + y^2)}{\omega_0^2 \left[1 + \left(\frac{\lambda z}{n\pi\omega_0^2}\right)^2\right]}\right\} \quad \text{Equation 1}$$

Figure 2D:
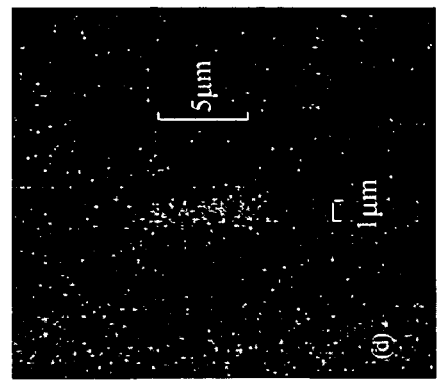
FIG. 2(d) illustrates an experimental image of a recorded data bit (532 nm @ 0.75 NA, bit size: 0.5×0.5×4.5 µm$^3$) from a fluorescent confocal microscope.
Figure 2C:
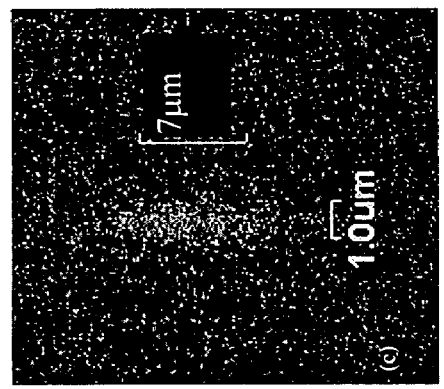
FIG. 2(c) illustrates an experimental image of a recorded data bit (532 nm @ 0.5 NA, bit size: 0.7×0.7×7 µm$^3$) from a fluorescent confocal microscope.
Figure 2B:
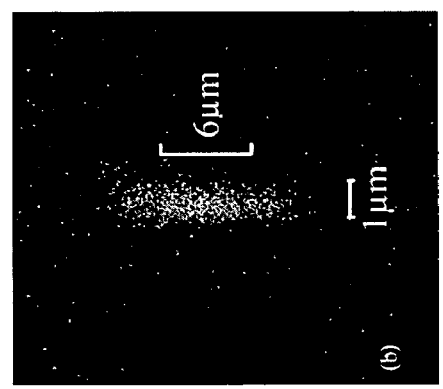
FIG. 2(b) illustrates an experimental image of a recorded data bit (460 nm @ 0.5 NA, bit size: 0.6×0.6×6.5 µm$^3$) from a fluorescent confocal microscope.
Figure 2A:
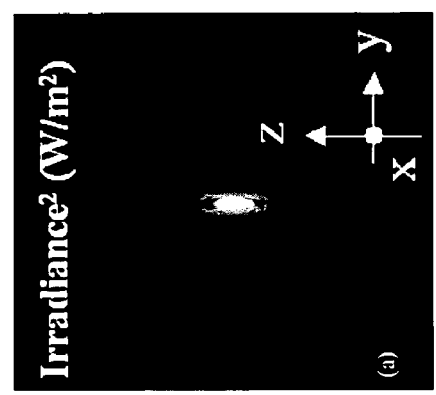
FIG. 2(a) illustrates a physical optics simulation of 0.5 NA axial PSF irradiance$^2$, 460 nm @ 0.5 NA, bit size of 0.6× 0.6×6 µm$^3$.

In Equation 1, $I_0/\omega_0^2$ is the peak irradiance, $\omega_0 \approx 0.6\lambda/NA$ is the radius of beam waist, $\lambda$ is the wavelength and NA is the numerical aperture. An OPTISCAN simulation, described in T. D. Milster, "A user-friendly diffraction modeling program", ODS Topical Meeting Conference Digest, Apr. 7-9, 1997, pp. 60-61, which is fully and expressly incorporated herein, shows the irradiance squared, $I^2$, distribution of a $\lambda=460$ nm, NA=0.5 system to have bit dimensions of $0.6*0.6*6$ $\mu m^3$ as shown in FIG. 2(a). Bit size is valued at the dimensions of $1/e^2$ of the peak fluorescence. FIG. 2(b) is the image of a real experimental recorded bit obtained with an Olympus fluorescence confocal microscope having dimensions of $0.6*0.6*6.5$ $\mu m^3$. This particular bit was recorded with a frequency doubled Ti:Saphire mode-locked laser (76 MHz repetition rate, 200 fs pulsewidth) with wavelength of $\lambda=460$ nm and 0.5 NA recording optics. Bit dimensions observed agree very well with the simulated value of the irradiance squared axial point spread function of the 0.5 NA optical system.

From the bit shape model, the inventors determined that the recorded bit size depends on the wavelength and the NA. FIG. 2(c) shows the experimental recorded bit with the 532 nm laser and 0.5 NA objective lens and the bit size is about $0.7*0.7*7$ $\mu m^3$ as expected based upon Equation 1. FIG. 2(d) is the recorded bit with the 532 nm laser and 0.75 NA objective lens and the bit size is about $0.5*0.5*4.5$ $\mu m^3$ as expected based upon Equation 1. The bit density for this recording is 3.3 TB/in$^3$. The recorded bits using the 532 nm laser also agree well with the simulation.

Data bit sizes of $0.4 \times 0.4 \times 2$ $\mu m^3$ have been recorded at 1.4 NA with a 532 nm laser that agree very well with the simulated values of $0.35 \times 0.35 \times 1.25$ $\mu m^3$ based upon Equation 1. Experimental results of the 1.4 NA recordings are presented in more detail herein.

With regard to the present invention, the inventors determined that NA directly influences the capacity by virtue of the radial and axial point spread function dependence on NA. A high NA objective lens reduces bit size allowing track and layer pitch to be reduced. In a 3-D multi-layer optical data storage system longitudinal bit length or layer separation influences the volume capacity. From analysis and experiments the axial point spread function of the recording beam determines the recorded bit length and layer crosstalk consideration determines the layer separation: the shorter the axial point spread function, the smaller the layer separation.

Based on the simulations of the data bit, the total aerial (single-layer) capacity is expressed as:

$$C_{areal} = \frac{\pi(r_{max}^2 - r_{min}^2)}{l_{bit} \times w_{pitch}} \quad \text{Equation 2}$$

In Equation 2, $r_{max}$, $r_{min}$ are max and min recording radius of the disk, $l_{bit}$ is the bit length and $w_{pitch}$ is the track pitch. The aerial capacity of a 5.25" two-photon disk using a 532 nm laser is, for example, approximately 1.4 GB at 0.5 NA and approximately 10.2 GB at 1.4 NA. Additionally, the bit size may be determined by the recording wavelength and NA, while the track size may be determined by the crosstalk performance of the readout.

The number of layers that can be recorded is expressed as:

$$N_{layer} = \frac{T_{disk}}{S_{layer}} \quad \text{Equation 3}$$

In Equation 3, $T_{disk}$ is the thickness of the disc and $S_{layer}$ is the layer separation.

The volume capacity of a two-photon 3-D optical data storage disk is expressed as:

$$C_{total} = C_{areal} N_{layer} \quad \text{Equation 4}$$

The working distance of the objective lens affects the volume capacity. FIG. 3 shows a geometric first order plot of objective lens working distance vs. NA. The working distance is defined as the longitudinal separation between the rear lens surface and the focal plane. Near-field objective lenses have traditionally been considered for single-layer data storage systems. Upon experimental investigation of commercially available Olympus microscope objective lenses, however, the inventors have observed that there is significant working distance for the NA range between NA=1.2→1.65 as shown in Table 1. In the inventors' experiments, an Olympus MplanApo 100X/1.4 NA oil immersion objective lens having 80 μm of working distance has been used to record data bits inside the volumetric photochromic media using two-photon absorption techniques. Additionally, the usable recording thickness may be defined by the sum of the W.D. and Cover Glass Thickness values.

TABLE 1

Commercially available high NA liquid-immersion Olympus objective lenses.

| Objective | Item | NA | W.D. (μm) | Cover Glass Thickness (mm) | Immersion |
|---|---|---|---|---|---|
| Plan Apochromat | PLAPO | 60XO3 | 1.40 | 150 | 0.17 | Oil |
| | | 60XO3TIRFM | 1.45 | 150 | 0.17 | Oil |
| | | 100XO3 | 1.40 | 100 | 0.17 | Oil |
| | UPLAPO | 60XW3/IR | 1.2 | 280 | 0.13–0.21 | Water |
| Others | APO | 100XOHR | 1.65 | 100 | 0.15 | Oil |
| | MPlanAPO | 100XO | 1.40 | 80 | 0 | Oil |

A commercially available or a custom designed high NA objective lens can be used with system 100. Also, the objective lens 110 can use either a liquid or air interface (liquid gap 150 or air gap).

Figure 4A:
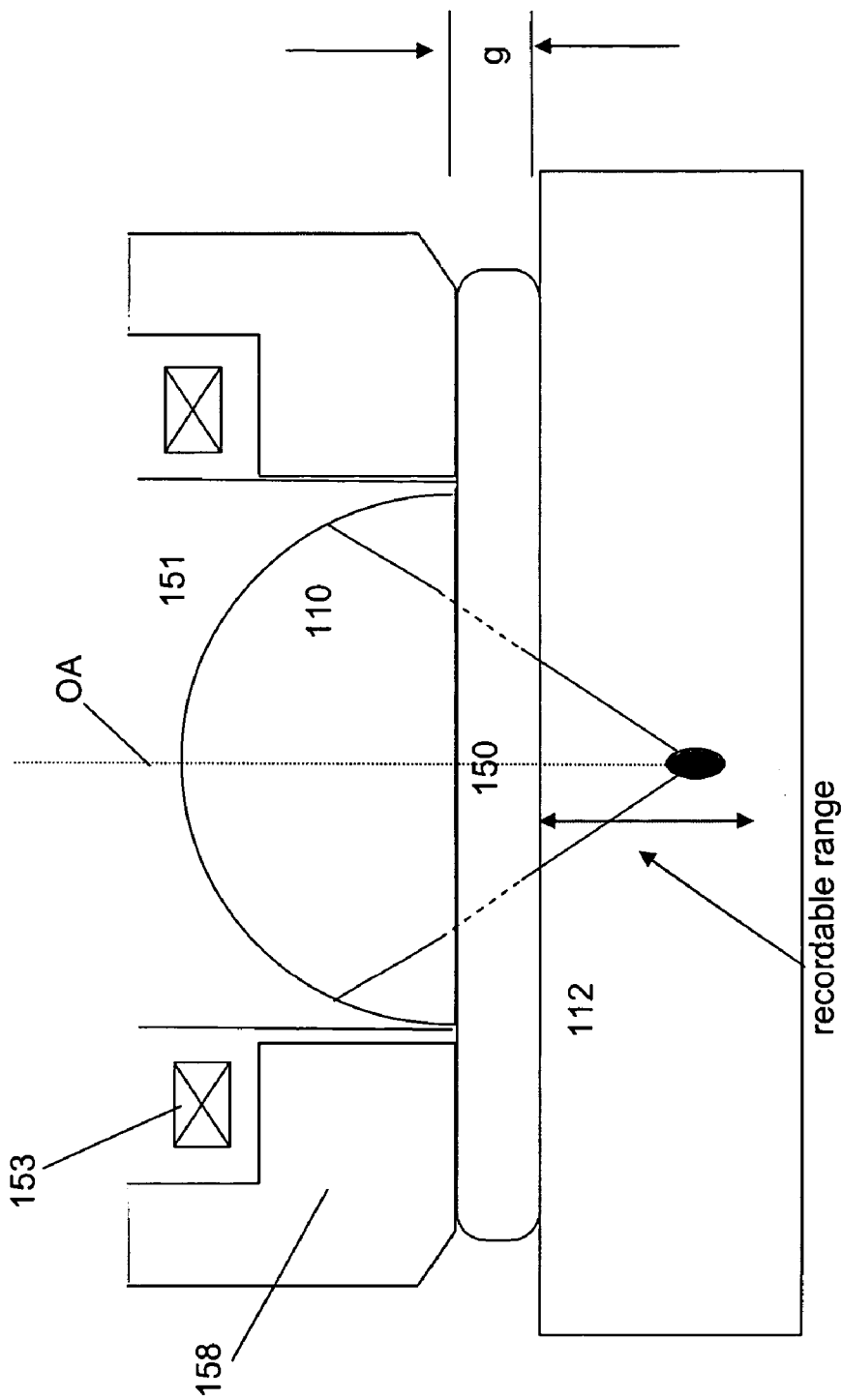
FIG. 4(a) illustrates the interface between the objective lens and the recording medium of a system of the present invention.

FIG. 4(a) illustrates a close up view of a liquid interface between the objective lens 110 and the recording medium 112 of the system 100. With the interface shown in FIG. 4(a), a liquid gap 150 is used between the objective lens 110 and the recording medium 112 rather than using an air gap between the objective lens 110 and recording medium 112. Using an air gap typically requires maintaining a gap between the objective lens 110 and recording medium 112 of about 20-100 nm, which in practice may be difficult to achieve. Further, in certain situations the use of an air gap may limit the realistic recordable range of the system 100 to <200 μm even with specially designed optics.

Figure 4B:
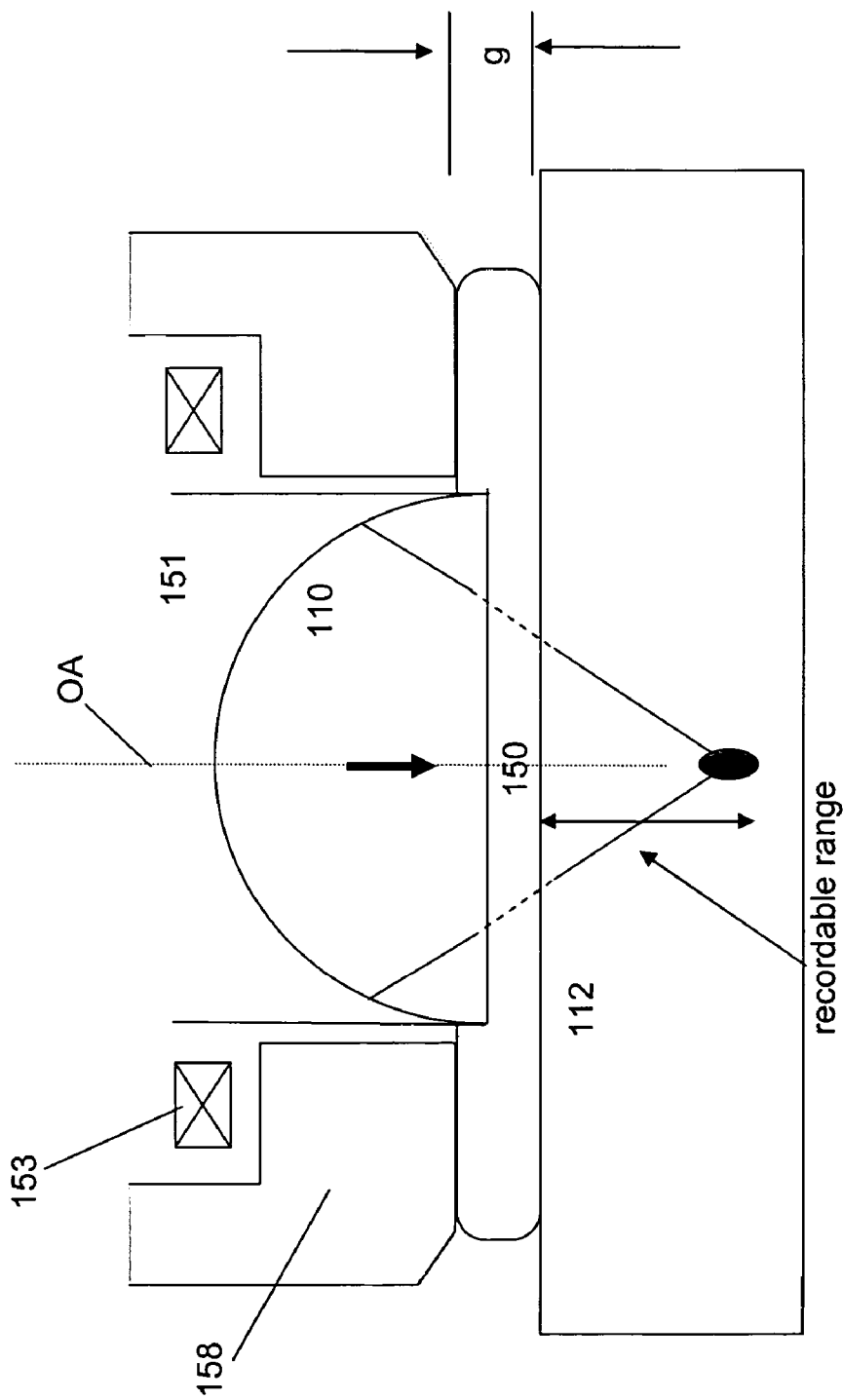
FIG. 4(b) is another illustration of the interface shown in FIG. 4(a).

By comparison, using the liquid gap 150 allows the gap between the objective lens 110 and the recording medium 112 to be variable depending on the application, i.e., the liquid gap 150 does not need to be maintained within a precise range unlike the approximate 20-100 nm separation required for an air gap. For example, although adjustment for focusing a laser beam to the desired depth within the recording medium 112 is accomplished by moving the objective lens 100, the optimum gap "g" of the liquid gap 150 between optics holder 158 and the recording medium 112 may independently vary from about 100 microns to 1-1.5 mm depending on the liquid and the liquid stabilization methods used. Also, the use of the liquid gap 150 allows a laser beam to travel between the objective lens 110 and the recording medium 112 without a disruption in the index of refraction. In the illustrated embodiment, an optics holder 158, a lens holder 151, and an actuator 153 are utilized with the liquid interface. The optics holder 158, lens holder 151, and actuator 153 shown in FIG. 4(a) may be used with any of the systems, and specifically objective lens 110/recording medium 112 interfaces, disclosed herein that use a liquid gap 150 between the objective lens 110 and recording medium 112. The optics holder 158 is disposed around the objective lens 110 and is in operable contact with the liquid gap 150. The optics holder 158 is used to maintain a generally fixed liquid gap 150, the optimum gap of which is identified by "g" and the size of which will depend on, e.g., the liquid used for the liquid gap 150, the recording medium 112, the objective lens 110, and the refractive indices thereof. As illustrated in FIG. 4(b), the lens holder 151 and the actuator 153 operate to move the objective lens 110 along an optical axis OA towards and away from the recording medium 112, depending on the desired recording or read depth within the recording medium 112. The use of the optics holder 158 allows for the objective lens 110 to be actuated without affecting the optimum gap "g" of the liquid gap 150. In another embodiment, a servo (not shown) is also used to maintain the liquid gap 150. Specifically, the servo is used to compensate for any surface irregularities on the recording medium 112 in order to maintain the liquid gap 150 within an acceptable range.

Figure 5:
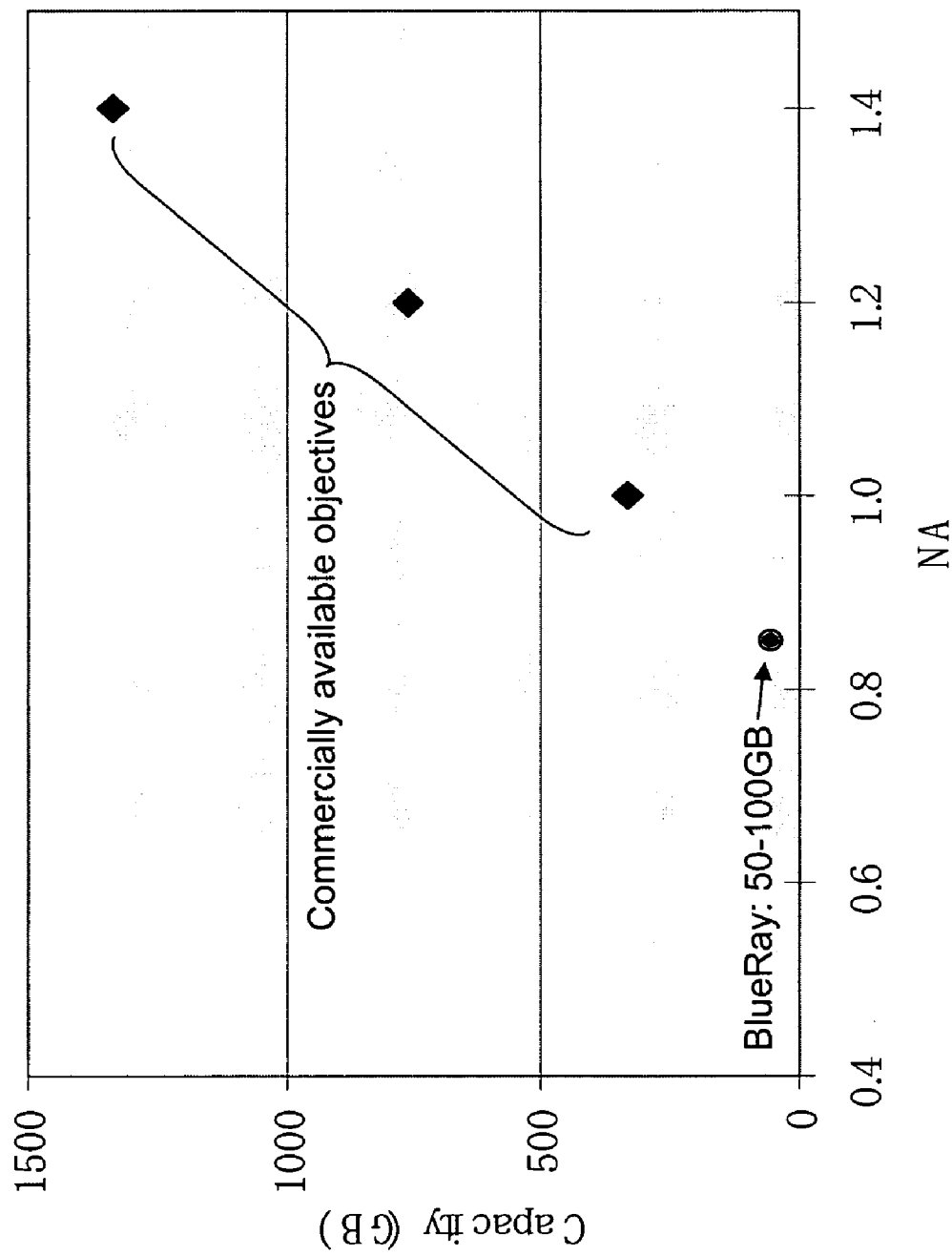
FIG. 5 is a graph showing the storage capacity at various NA of a system of the present invention using a commercial-available objective lens.

The liquid used for the liquid gap 150 may be any suitable liquid for maintaining an acceptable index of refraction, including water or oil-based liquids that may vary based upon the materials used for the recording medium 112 and the refraction indices of those materials. The use of the liquid gap 150 allows for a realistic recordable range of >200 μm with commercially-available lenses, such as, e.g., an Olympus MplanApo 100X or liquid immersion microscope lenses. Using a commercial-available lens for the objective lens 110, the system 100 is capable of achieving greatly increased capacities at various NA, as shown in FIG. 5. For example, 330 GB may be achieved with 1.0 NA, 760 GB may be achieved with 1.2 NA, and 1330 GB may be achieved with 1.4 NA. For comparison purposes, the storage capacity of a Blu-ray system is also shown on FIG. 5.

Figure 6:
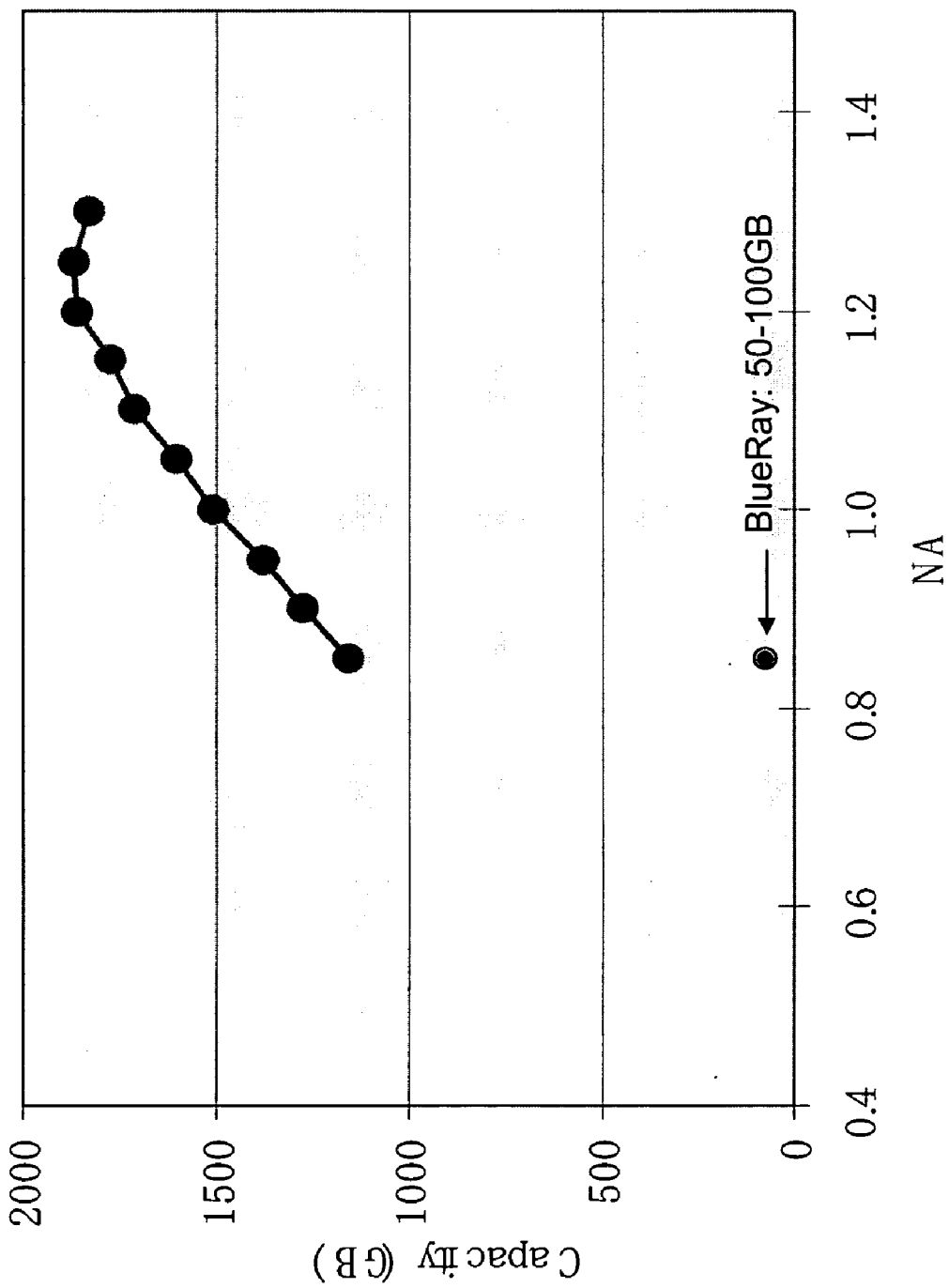
FIG. 6 is a graph showing the storage capacity at various NA of a system of the present invention using a custom lens of the present invention.
Figure 8A:
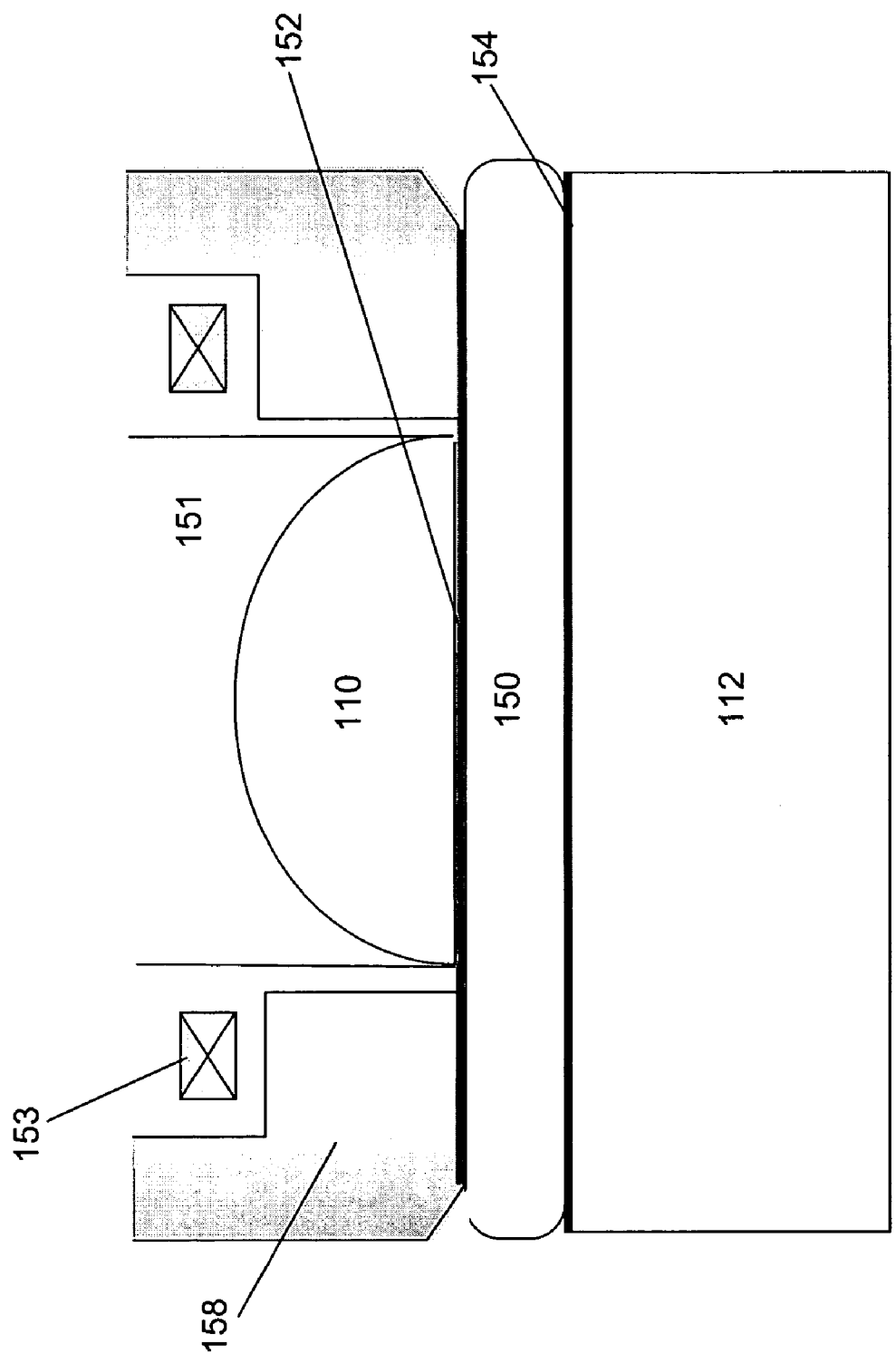
FIG. 8(a) is embodiment of a system of the present invention for which hydrophilic and hydrophobic coatings are used to maintain a liquid gap between the objective lens and the recording medium.
Figure 8B:
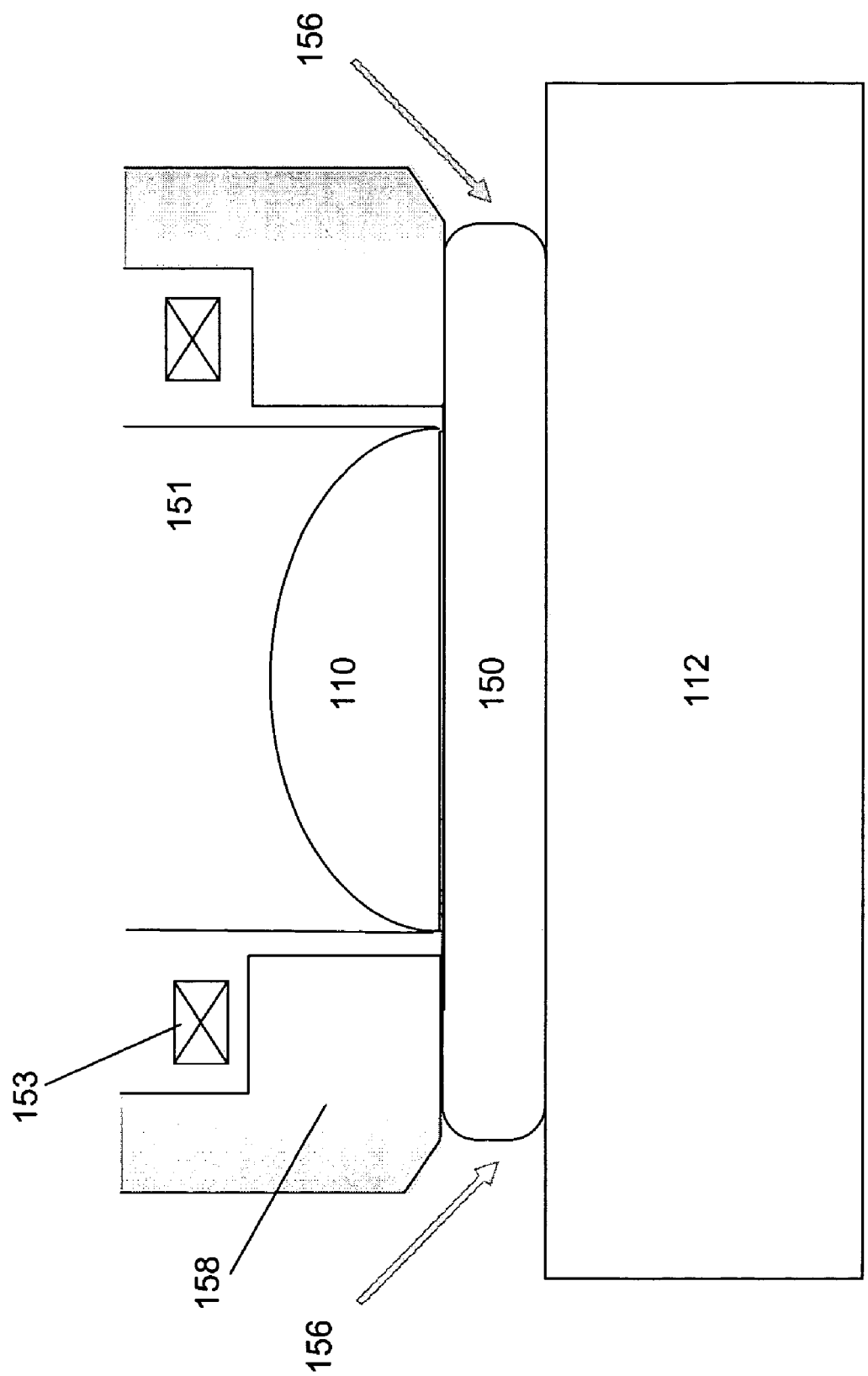
FIG. 8(b) illustrates an embodiment of a system of the present invention that uses gas or air pressure, such as an "air knife," to maintain a liquid gap between the objective lens and the recording medium.
Figure 8C:
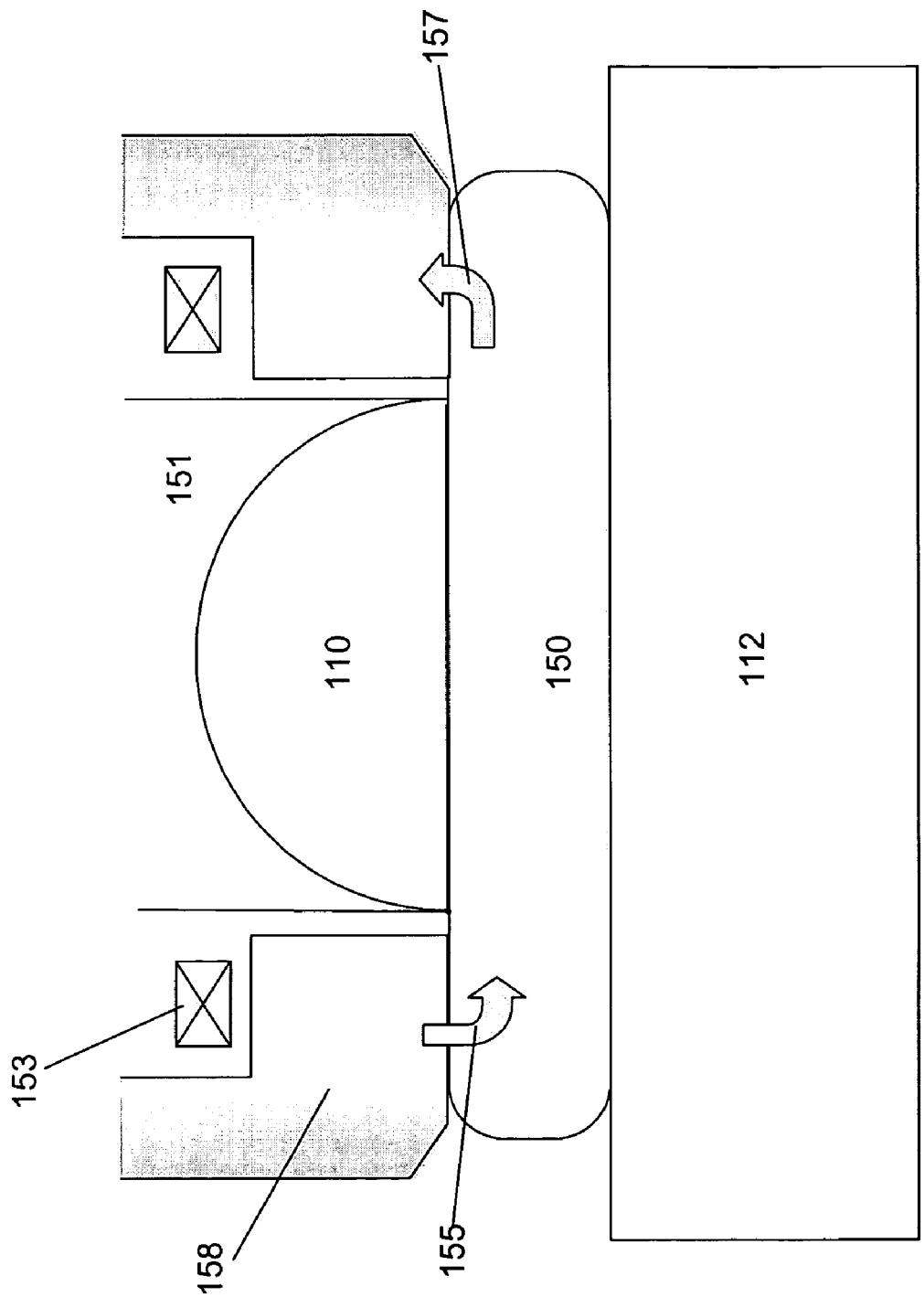
FIG. 8(c) illustrates an embodiment of a system of the present invention that uses an optics holder to maintain a liquid gap between the objective lens and the recording medium.
Figure 8D:
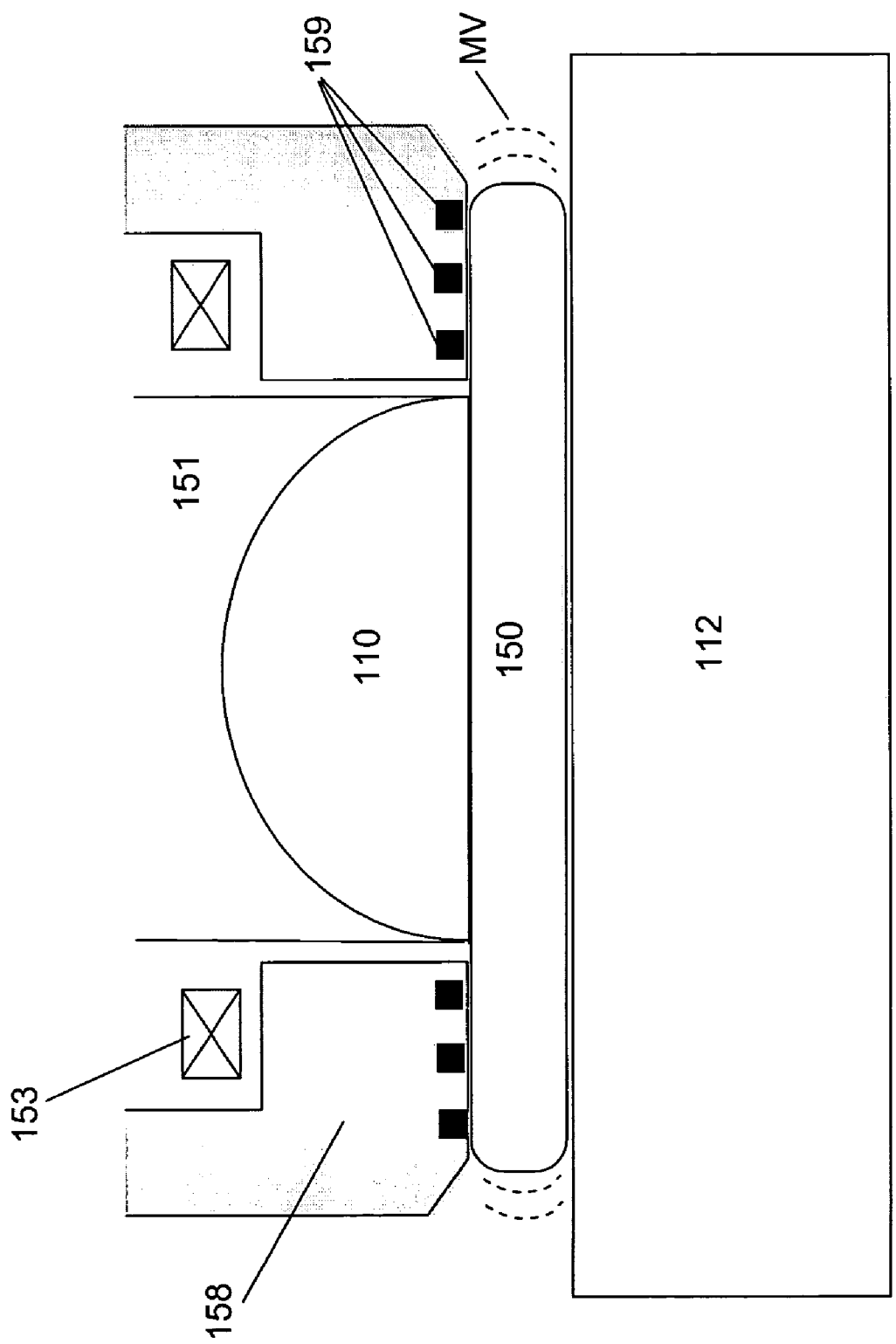
FIG. 8(d) illustrates an embodiment of a system of the present invention that uses microvibrations and surface tension to maintain a liquid gap between the objective lens and the recording medium.
Figure 8E:
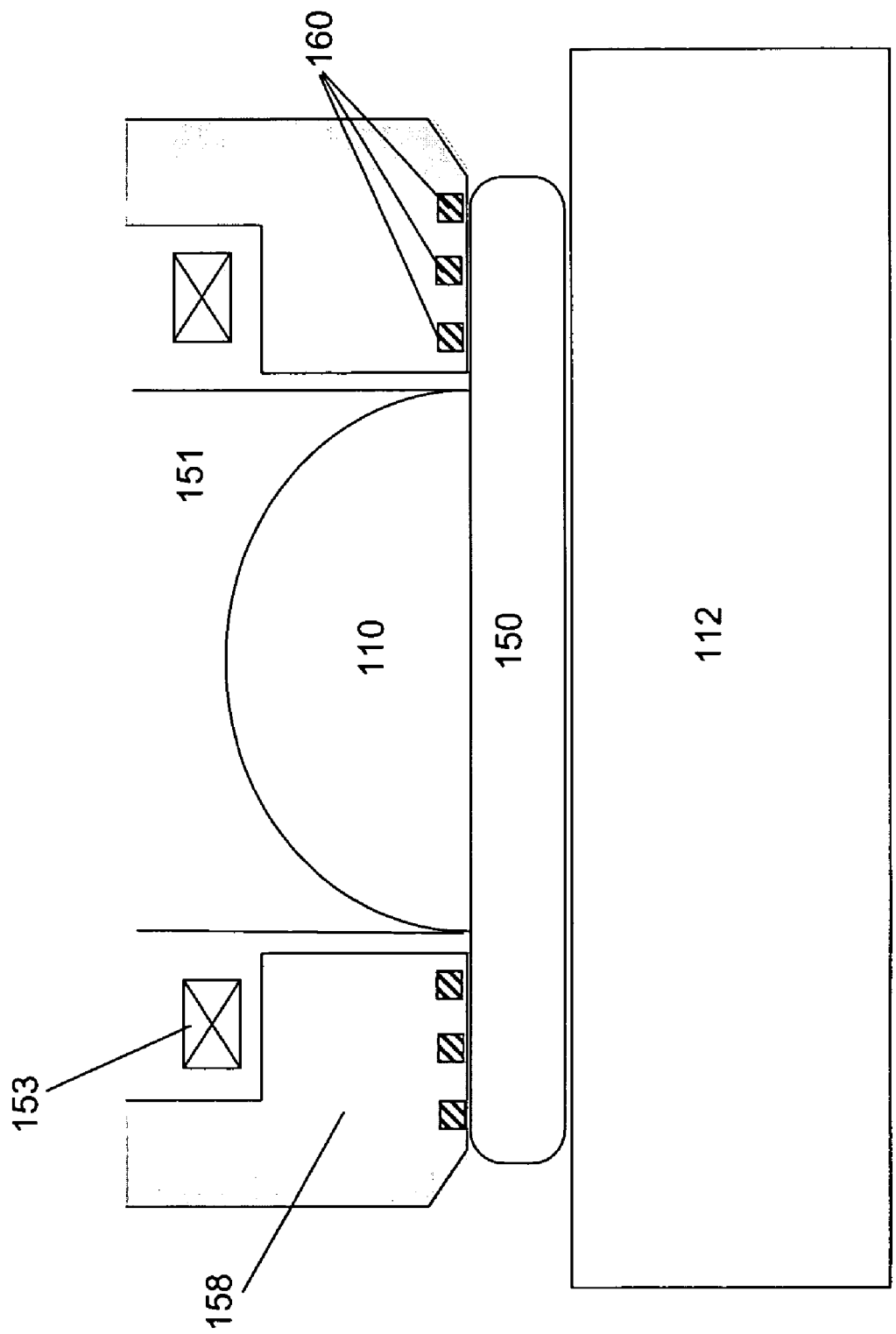
FIG. 8(e) illustrates an embodiment of a system of the present invention that uses electrodes to maintain a liquid gap between the objective lens and the recording medium.
Figure 8F:
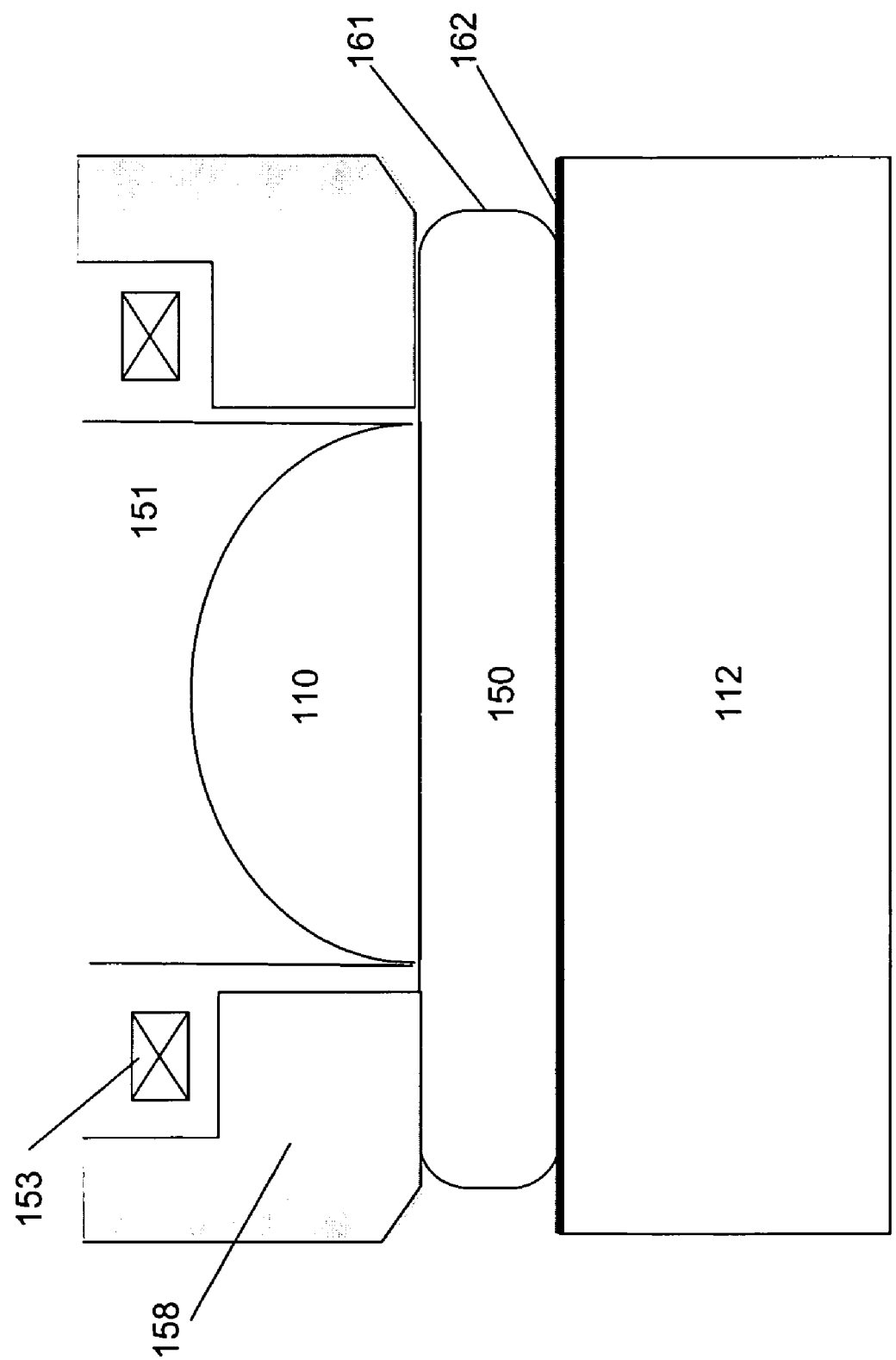
FIG. 8(f) illustrates an additional method of stabilizing the position of the liquid gap.

Alternatively, when a custom lens of the present invention is used as the objective lens 110, realistic recordable ranges of >1 mm may be achieved, thereby allowing for hundreds of recording layers and greatly increased recording capacity. The custom lens may be, in general, a liquid interface singlet lens that allows for longer working distances/depths within the recording medium 112, and is less prone to aberrations than current commercially-available lenses such as objective lenses for DVD or Blu-ray systems that have air interfaces. The custom lens is also preferably more tolerant to disk tilt, i.e., as long as a proper focus is maintained, the tilt of the recording medium 112 has a negligible effect on system performance. FIG. 6 illustrates the additional increase in storage capacity at various NA that is possible with a custom lens of the present invention. In addition to the systems of the present invention, the custom lens is usable with all optical data storage systems including existing optical data storage systems such as, e.g., DVDs, Blu-ray systems, other bit-wise 3D optical storage systems, other holographic 3D optical storage systems, and the like.

The custom liquid interface singlet lens of the present invention is designed with parameters that minimize aberration of a laser beam traveling through the lens to the recording medium. For example, the curvature of the surface facing the recording medium and the surface facing the recording or readout lasers are designed to minimize aberration of the laser beams, such as, e.g., by using appropriate radius of curvature, conic coefficient, $4^{th}$ order coefficient, and $6^{th}$ order coefficient for the two surfaces. Additionally, the refractive index for the custom lens will be varied depending on the refractive index of the gap between the custom lens and the recording medium, the refractive index for the recording medium, and the refractive index of the area behind the custom lens, i.e., the area between the custom lens and the lasers, if this area is not occupied by air. Additional design parameters that should be considered when designing the custom lens to minimize aberration include the center thickness of the custom lens, the wavelength of the lasers that will travel through the custom lens, the working distance, and the numerical aperture of the system. One of ordinary skill in the art will be able to determine the necessary parameters for various specific applications of the custom lens.

FIG. 7(a) is a schematic diagram of a custom lens 110(a) usable as the objective lens 110 of the system 100. Custom lens 110(a) is a liquid interface singlet lens. Additionally, custom lens 110(a) may be designed for recording with various recording media, and the design parameters of custom lens 110(a) will vary depending on the specific recording medium 112 used with the custom lens 110(a). Liquid gap 150 may be chosen to have a similar refractive index as that of recording medium 112. Preferably, the any difference between the refractive indices should be smaller than 0.05, and more preferably smaller than 0.01. FIGS. 7(b) to 7(e) provide exemplary design parameters for various applications of the custom lens 110(a) in which the refractive index difference between the liquid gap 150 and the recording medium 112 is about 0.01. It will be appreciated, however, that the design of the custom lens 110(a) and the corresponding design parameters of the custom lens 110(a) may be extended to systems having a larger refractive index difference between the liquid gap 150 and the recording medium 112, or systems operating with different wavelengths. Preferably, focal length is about 2.15 mm and the effective aperture is about 4.3 mm as in these examples, however, these design parameters may be chosen flexibly according to the system requirement.

FIG. 7(b) is a table showing exemplary design parameters for a custom lens 110(a) designed for recording with a recording medium 112 having a refractive index of about 1.592, such as, e.g., a recording medium 112 that includes polycarbonate or similar compounds. This custom lens 110(a) is also designed for use with a liquid gap 150 that has a refractive index difference of less than about 0.01 from that of the recording medium 112. A suitable liquid gap 150 may be one that uses a suitable index matching oil available from R.P. Cargille Laboratories (Cedar Grove, N.J.) or similar liquids.

FIG. 7(c) is a table showing exemplary design parameters for a custom lens 110(a) designed for use with a recording medium 112 having a refractive index of about 1.31, such as, e.g., a recording medium 112 that includes a synthetic fluorine-containing resin such as Teflon® AF, which is available from E. I. du Pont de Nemours and Company (Wilmington, Del.), or similar compounds. The liquid gap 150 for this configuration preferably has a refractive index difference of less than about 0.01 from that of the recording medium 112, such as, e.g., a highly fluorinated organic composition such as Fluorinert®, available from 3M (St. Paul, Minn.), or a similar liquids.

FIG. 7(d) is a table showing exemplary design parameters for a custom lens 110(a) designed to be used with a recording medium 112 having a refractive index of about 1.34, which may be, e.g., a recording medium 112 that includes a fluoropolymer resin such as Cytop®, available from Asahi Glass Company (Tokyo, Japan), or similar compounds. The liquid gap 150 for this configuration preferably has a refractive index difference of less than about 0.01 from that of the recording medium 112 and may be comprised of water.

FIG. 7(e) is a table showing exemplary design parameters for a custom lens 110(a) designed to be used with a recording medium 112 having a refractive index of about 1.495, which may be, e.g., a recording medium 112 that includes polymethyl methacrylate ("PMMA") or similar compounds. The liquid gap 150 used with custom lens 110(a) preferably has a refractive index difference of less than about 0.01 from the recording medium 112 and may be comprised of a suitable index matching oil available from R.P. Cargille Laboratories (Cedar Grove, N.J.) or similar liquids.

Additionally, in other embodiments the NA range for custom lens 110(a) may be extended to, for example, from about 0.5 to about 1.3 depending on the particular application of the system 100. The data plot shown in FIG. 6 is based on custom lens data that is actually obtained for each NA on the graph. A typical design process preferably begins with the lens design data shown in FIGS. 7(b) to 7(e). One of ordinary skill in the art will appreciate that this data may be modified depending on the particular application. Designing custom lens 110(a) typically requires at least the lower orders of coefficients shown in FIGS. 7(b) to 7(e). Additionally, aberration correction during the design process typically becomes easier when higher orders of coefficients are used. Further, custom lens 110(a) may be designed using refractive indices other than the indices identified in FIGS. 7(b) to 7(e). The refractive indices may, for example, be chosen to result in a longer working distance depending on the refractive index of the liquid gap 150 or the recording medium 112. A relatively higher refractive index for the lens 110(a) is preferable for a liquid gap 150 or recording medium 112 of relatively higher refractive index in order to obtain a longer working distance. A relatively lower refractive index for the lens 110(a) is preferred for a liquid gap 150 or recording medium 112 of relatively lower refractive index in order to obtain a longer working distance. The center thickness of the custom lens 110(a) also has a direct impact on the working distance. For example, it is preferable to choose thinner center thicknesses within a range that lens manufacturing technologies will allow. A practical range may be, for example, between 2 mm to 3.5 mm for the lens design data shown in FIGS. 7(b) to 7(e). In general, lens fabrication may be difficult with current technologies when the center thickness is less than 2 mm as the peripheral thickness becomes very thin. Conversely, using current technologies the working distance may not be sufficient when the center thickness is longer than 3.5 mm. Newer technologies may allow the use of center thicknesses outside the range of 2 mm to 3.5 mm. One particular benefit of a liquid interface singlet custom lens of the present invention is that a longer working distance may be obtained when compared to commercially available liquid immersion lenses. The longer working distance allows the use of thicker recording medium than would otherwise be possible and therefore the realization of higher storage capacity. An additional benefit of a liquid interface singlet custom lens of the present invention is its relative lightness in weight, typically less than a gram, when compared to commercially available liquid immersion lenses, which are on the order of 100 grams. The light weight possible with the liquid interface singlet custom lens of the present invention enables the use of existing actuators with the custom lens, including actuators used for, e.g., DVD systems, Blu-ray disk systems, and the like. Additionally, the custom lens 110(*a*) may be focused to varying depths within the recording medium 112, which may be, e.g., a disk, by using a suitable spherical aberration compensator ("SAC").

Unless indicated otherwise, in all of the descriptions of system 100 in this disclosure, any reference to objective lens 110 will be understood to also include the use of custom lens 110(*a*)

Because of the rotational speed of the recording medium 112, the liquid gap 150 would tend to disperse as the recording medium 112 rotated unless the system 100 included a stabilizing component at the interface of the objective lens 110, the liquid gap 150, and the recording medium 112. Several stabilizing methods, shown in FIGS. 8(*a*)-8(*f*), may be used in order to maintain the integrity and stability of the interface between the objective lens 110, the liquid gap 150, and the recording medium 112 when the system 100 is in operation.

In FIG. 8(*a*), a hydrophilic or attractive coating 152 is applied to the face of the objective lens 110 that is in physical contact with the liquid gap 150. Additionally, the hydrophilic coating 152 may be applied to the surface of the optics holder 158 that is in physical contact with the liquid gap 150. The hydrophilic coating 152 may be any suitable hydrophilic material, such as, fluoroalkyl esters and fluorochemical surface active agents, including Zonyl®, available from E. I. du Pont de Nemours and Company (Wilmington, Del.). Additionally, a hydrophobic or repellent coating 154 is applied to the surface of the recording medium 112 that is in physical contact with the liquid gap 150. The hydrophobic coating 154 may be any suitable hydrophobic material, including polymers such as Teflon®, available from E. I. du Pont de Nemours and Company (Wilmington, Del.), or similar compounds. Alternately, it may be a certain nano-structure, such as seen in Lotus leaf, which may be fabricated on the surface of the recording medium 112 by, for example, stamping or molding, or its combination with other repellent coatings. The hydrophilic coating 152 aids in maintaining the position of the liquid gap 150 at the interface of the objective lens 110 and the recording medium 112, and the hydrophobic coating 154 on the recording medium 112 prevents the liquid gap 150 from dispersing as a result of the rotation of the recording medium 112 during the operation of the system 100.

FIG. 8(*b*) illustrates another method of maintaining the integrity of the interface between the objective lens 110, the liquid gap 150, and the recording medium 112. With this embodiment, gas or air pressure is used to assist in maintaining the interface. Specifically, a sufficient amount of pressure using gas or air, i.e., an "air knife" 156, is applied to the liquid gap 150, and preferably to the back side of the liquid gap 150, in order to stabilize and maintain the position of the liquid gap 150 while the system 100 is operational and the recording medium 112 is spinning. In another embodiment, the air knife 156 is used together with the other liquid gap maintenance methods of the present invention, such as, e.g. the hydrophilic coating 152 and the hydrophobic coating 154 shown in FIG. 6(*a*) to further stabilize and maintain the liquid gap 150.

FIG. 8(*c*) illustrates a method of maintaining the interface using an optics holder 158 modified to circulate the liquid of the liquid gap 150. Here, the optics holder 158 includes a liquid supply 155 and a liquid return 157 path. The optics holder 158 is placed around the objective lens 110 and also on top of the liquid gap 150. The optics holder 158 is used to circulate the liquid that forms the liquid gap 150, thereby further maintaining the position of the liquid gap 150 underneath the objective lens 110 and within the interface formed by the objective lens 110, liquid gap 150, and the recording medium 112. This method may also be used with the other liquid gap maintenance methods disclosed herein.

FIG. 8(*d*) illustrates another method of stabilizing the position of the liquid gap 150. Here, the optics holder 158 includes transducers 159 along the surface of the optics holder 158 that is in contact with the liquid gap 150. There may be one transducer 159 on each side of the optics holder 158 or, as illustrated, a plurality of transducers 159 on each side. With this embodiment, surface tension is used to maintain the position of the liquid gap 150. Specifically, the transducers 159 are used to apply continuous microvibrations MV applied to the liquid gap 150. The microvibrations MV break the surface tension between the liquid gap 150 and the recording medium 112 in order to prevent the liquid gap 150 from being displaced with the rotation of the recording medium 112. In another embodiment, the transducers 159 are used together with the hydrophilic coating 152 and the hydrophobic coating 154 shown in FIG. 8(*a*) and/or the other stabilizing methods disclosed herein to further stabilize and maintain the liquid gap 150.

FIG. 8(*e*) illustrates an additional method of stabilizing the position of the liquid gap 150. Here, the optics holder 158 includes electrodes 160 along the surface of the optics holder 158 that is in contact with the liquid gap 150. Each electrode 160 also preferably includes a coating that repels liquid when the electrode 160 is in an "off" state and has a reduced repellancy when the electrode 160 is in an "on" state. The electrodes 160 may therefore be used to electrically control the position of the liquid gap 150 through a periodic on/off cycle. During the cycle, liquid drops that make up the liquid gap 150 will move between individual "off" electrodes 160 and "on" electrodes 160 by being repelled from "off" electrodes 160 and attracted to "on" electrodes 160. This embodiment may be used with the other methods of maintaining the liquid gap, such as, e.g., application of microvibrations MV and/or the use of the hydrophilic coating 152 and the hydrophobic coating 154.

FIG. 8(*f*) shows another method of stabilizing the position of the liquid gap 150. This embodiment utilizes a substantially transparent bag 161 to hold the liquid that forms the liquid gap 150. The transparent bag 161 is manufactured from a pliant material that is capable of expanding and flexing as the objective lens 110 and the lens holder 151 are moved towards and away from the recording medium 112. The top surface of the transparent bag 161 is coupled to the optics holder 158, objective lens 110, lens holder 151, or any combination of the three components. The bottom surface of the transparent bag 161 is in operable contact with the recording medium 112 and maintains the position of the liquid gap 150 and the laser path during the operation of the system 100. Additionally, a lubricant layer 162 may be applied to the surface of the recording medium 112 that is in physical contact with the transparent bag 160 in order to prevent the transparent bag 160 from adhering to the recording medium 112. The lubricant layer 162 may consist of any suitable compound, including oil-based materials. In another embodiment, the transparent bag 161 contains a lubricant and is formed from a membrane that allows a minimal amount of the lubricant to be applied to the recording medium 112 in order to form the lubricant layer 162. The application of the minimal amount of lubricant from the transparent bag 161 may be accomplished using any suitable means, such as, e.g., pores in the membrane. This method of stabilizing the position of the liquid gap 150 may also incorporate both a separate lubricant layer 162 and the transparent bag 161 that is formed from a membrane that allows a minimal amount of lubricant to be applied to the recording medium 112.

Figure 9C:
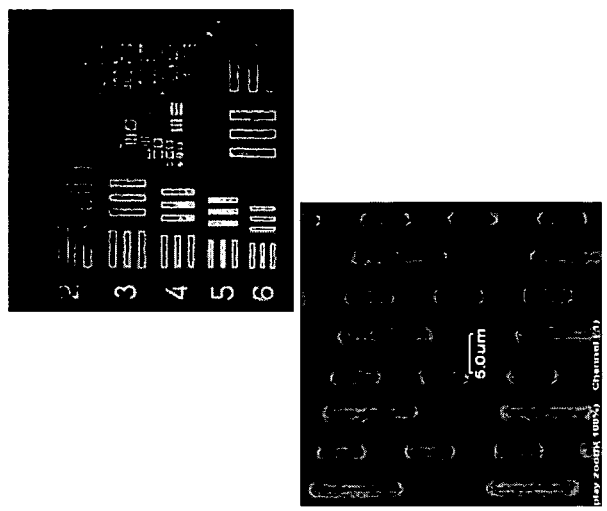
FIG. 9(c) illustrates spatial resolution of media readout by fluorescence and readout of fluorescent pulse modulated bits.
Figure 9B:
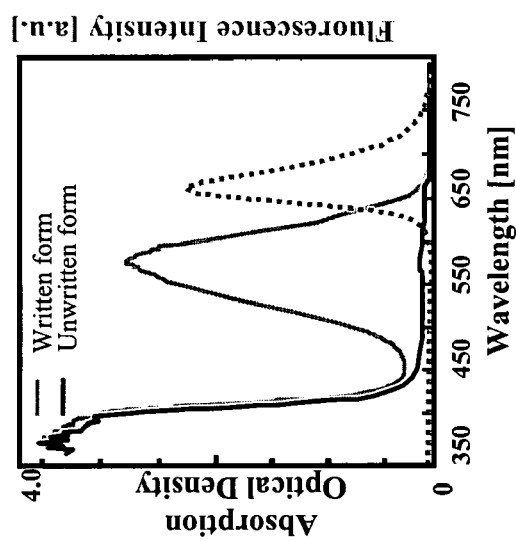
FIG. 9(b) illustrates spectral characteristics of unwritten and written photochromic media.
Figure 9A:
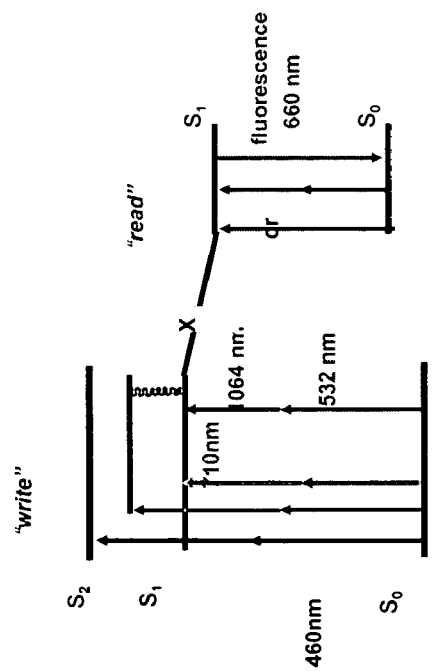
FIG. 9(a) illustrates an energy diagram of a two-photon recording and single-photon readout and fluorescence emission.

An energy diagram of two-photon recording and single-photon readout and fluorescence emission is illustrated in FIG. 9(a). FIG. 9(b) shows the spectral characteristics of unwritten and written photochromic media. FIG. 9(c) illustrates spatial resolution of the media readout by fluorescence and readout of fluorescent pulse modulated bits. The present invention also provides for a material used to form a recording medium 112 that is operable with shorter wavelengths, such as, e.g., wavelengths below 500 nm, in order to accomplish ultra-high storage capacity as compared with current techniques and materials. The new material system is preferably a compound that is capable of an approximate 50% photoreaction quantum yield, an approximate 100% fluorescence quantum yield, and has a decomposition temperature of around 245° C. An example material usable with the new material system is diphenyl anthracene and the following compound (see also A. Zweig, Pure and Applied Chemistry, 33 (1973) 389-410):

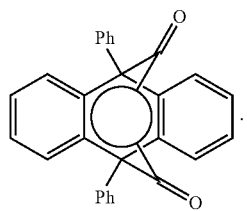

Figure 10A:
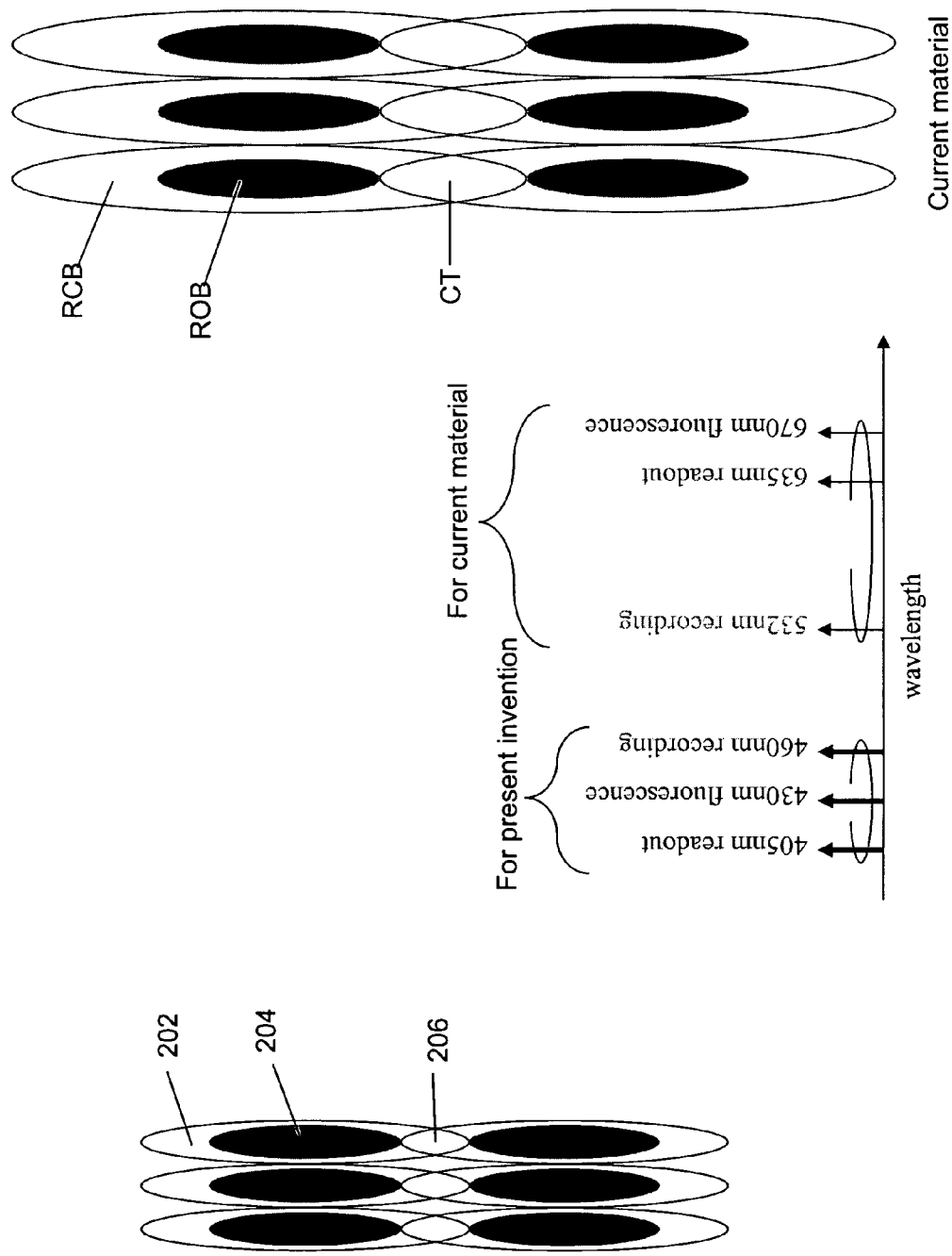
FIG. 10(a) illustrates a recording medium of the present invention that incorporates a material system allowing the use of shorter wavelengths, e.g., in the 400 to mid-400 nm range, for recording and readout.
Figure 10B:
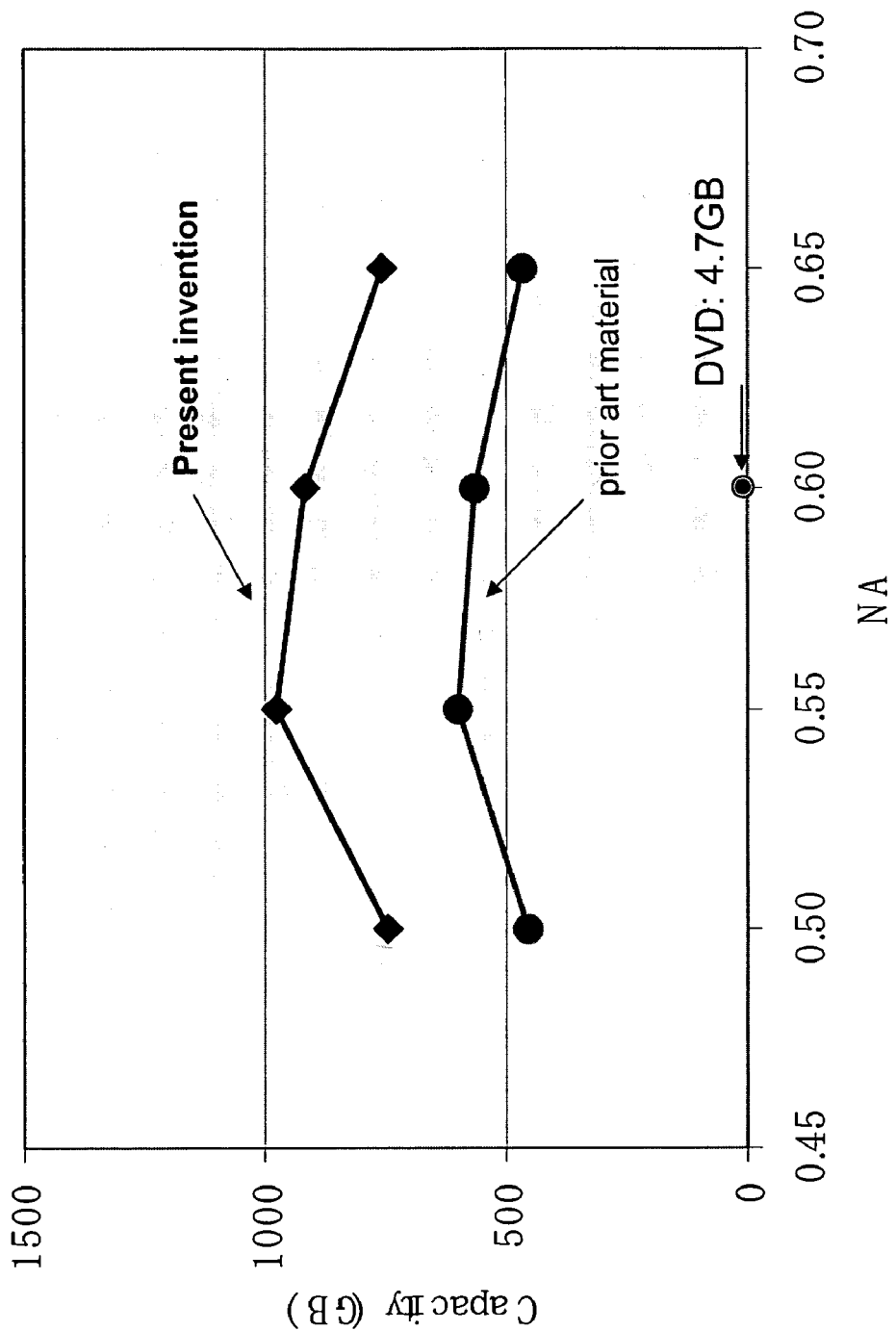
FIG. 10(b) illustrates the storage capacity of the new material system compared with prior art materials.

FIG. 10(a) illustrates the shorter wavelengths that may be used with the new material system in comparison with the wavelengths that are typically used for current materials. Using the new material system, a readout laser beam 202 may be approximately 405 nm, a recording laser beam 204 may be approximately 460 nm, and the fluorescence generated by the readout process may be approximately 430 nm. When current materials are used for the recording medium 112, the recording laser beam RCB must be in the 532 nm range, the readout laser beam ROB must be in the 635 nm range, and fluorescence in the 670 nm range is produced. The result is that, in comparison to current materials, the new material system allows for the recording laser beam 204 that is closer in size to the readout laser beam 202, whereas the recording laser beam RCB and the readout laser beam ROB used with current materials have a larger size disparity. The new material system is therefore more efficient than current materials. Additionally, the smaller footprint of the readout laser beam 202 allows for a smaller crosstalk area 206 than is possible with current materials, which have a relatively larger crosstalk area CT. That is, use of the new material system along with shorter wavelengths allows for a closer bit arrangement than currently possible. FIG. 10(b) is a graph that illustrates the storage capacity of the new material system compared with prior art materials.

Figure 11A:
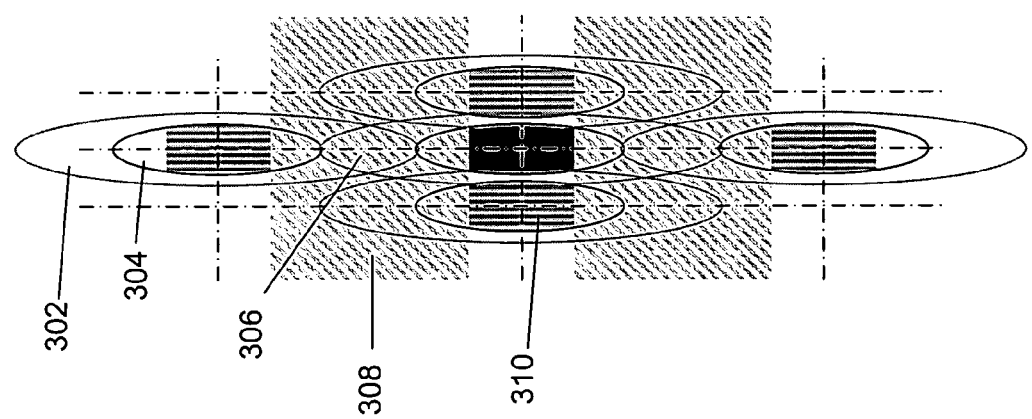
FIG. 11(a) illustrates a multilayer structure of the present invention that increases the storage capacity of recording media.
Figure 11B:
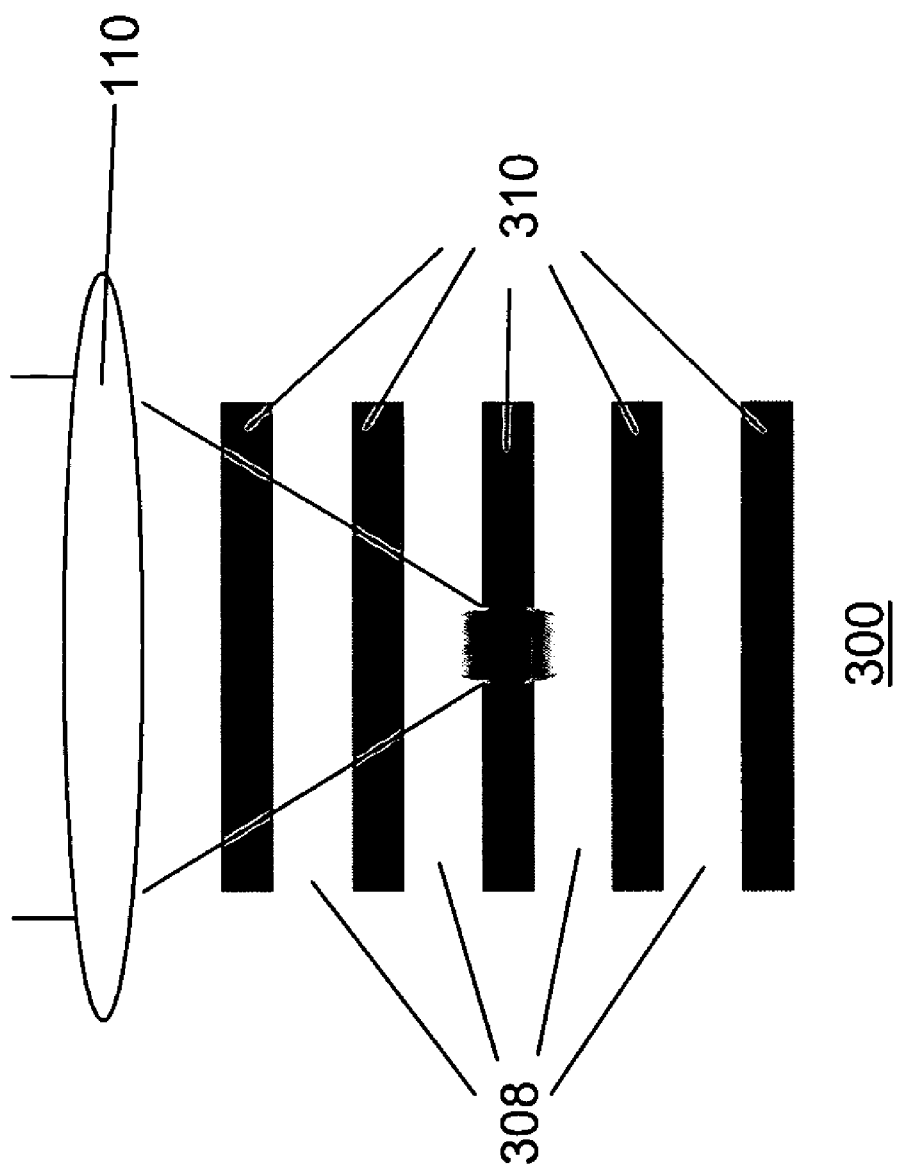
FIG. 11(b) illustrates another schematic diagram of the multilayer structure of the present invention.
Figure 11C:
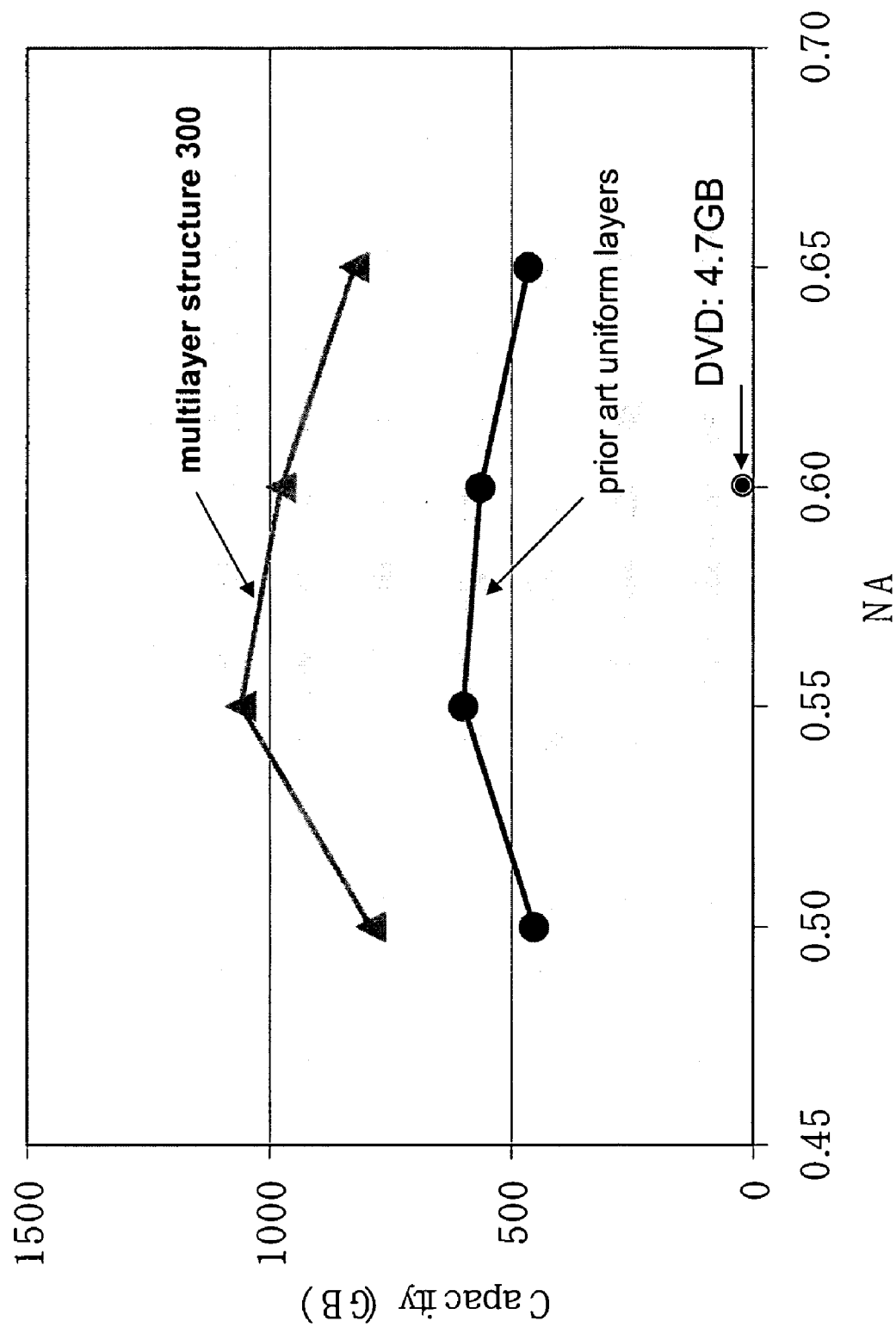
FIG. 11(c) is a graph illustrating the capacity of a recording medium using the multilayer structure of the present invention.

The present invention also provides for a multilayer structure 300 having intermediate buffer layers that provides for ultra-high storage capacity as compared with currently known recording media. FIG. 11(a) illustrates a multilayer structure 300 of the present invention. The multilayer structure 300 includes active layers 310 interspersed between and buffer layers 308. The buffer layers 308 are dead zones between active layers 310 that do not allow for recording of data. Further, the buffer layers 308 are designed such that the crosstalk areas 306 that arise due to overlap between recording laser beams 304 and readout laser beams 302 are confined to the buffer layers 308. By confining the crosstalk areas 306 to the buffer layers 308, any adverse effects of the crosstalk areas 306 on the performance of recording media that use the multilayer structure 300 are reduced. The recorded bits are confined to the active layers 310. FIG. 11(b) illustrates another schematic diagram of the multilayer structure 300, and shows the alternating arrangement of active layers 310 and buffer layers 308 as well as an objective lens 110 focusing a laser beam on an active layer 310. The multilayer structure 300 may be prepared by using alternating layers of a suitable material, such as, e.g., a polymethylmethacrylate ("PMMA") based material that has not been mixed with an active species, for the buffer layers 308 and a recordable material, such as, e.g., any of the materials disclosed herein including the new material system, for the active layers 310. Recording media that incorporates the multilayer structure 300 may be used with both high and low NA optics in order to increase the recording capacity of the system. FIG. 11(c) illustrates the capacity of a recording medium using the multilayer structure 300 using various NA. For comparison purposes, FIG. 11(c) also shows the storage capacity of a prior art recording medium using a typical uniform structure at various NA, as well as the recording capacity of a DVD at 0.60 NA, which is the NA used for current DVD players.

By having an arrangement of alternating active layers 310 and buffer layers 308, it is possible to have a closer recording bit arrangement than may be achieved with current recording media, thereby increasing the storage capacity of recording media that use the multilayer structure 300. For 1.4 NA optics, as one example, the active layer 310 and buffer layer 308 thicknesses are designed to ensure a cross talk level of <30 dB. If the thickness of the active layer 310 is about 1.24 microns, which is the same as the bit length $l_{bit}$, then the corresponding buffer layer 308 thickness is about 0.8 microns. Layers having these thicknesses produce more than an approximate 15% increase in storage capacity compared to a conventional uniform medium. By choosing a thinner active layer 310, it is possible to further increase the storage capacity of the recording media. For example, when the active layer 310 is about 0.62 microns, which is a half of $l_{bit}$, then the corresponding buffer layer 308 thickness is 1.14 microns. This arrangement results in an approximate 25% increase in storage capacity. As another example, when the thickness of the active layer 310 is about 0.31 microns, which is one quarter of $l_{bit}$, then the acceptable corresponding buffer layer 308 is about 1.25 microns. This arrangement results in an approximate 40% increase in storage capacity.

Figure 12A:
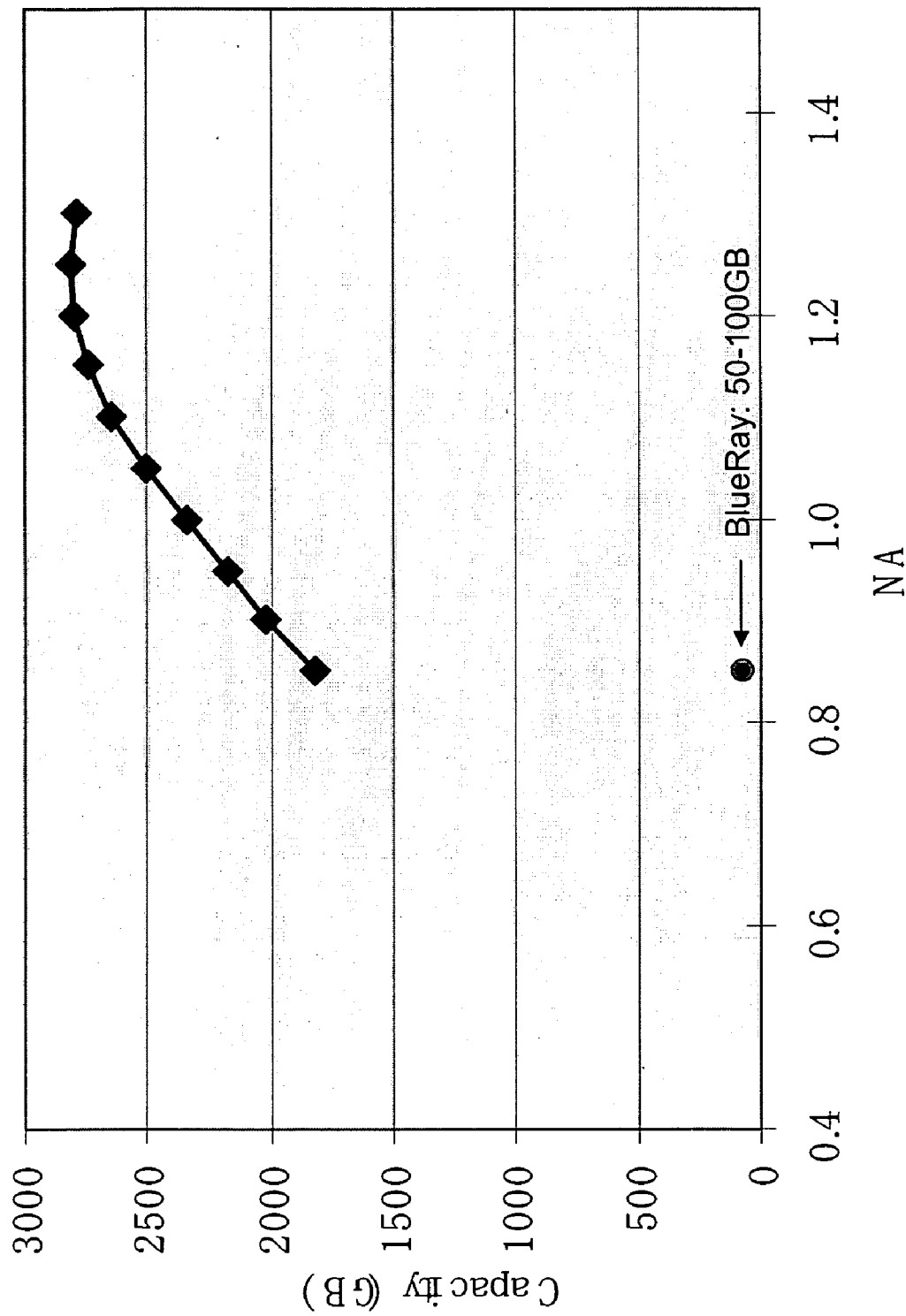
FIG. 12(a) is a graph illustrating the storage capacity of a system of the present invention in use with a recording medium of the present invention that is capable of operating in shorter (~400 to mid-400 nm) wavelengths.

The various systems, materials, and methods of the present invention may be used in combination in order to cumulatively increase the storage capacity of a recording medium. For example, combining system 100 having a custom liquid interface singlet lens with the new material system that uses shorter wavelengths than current systems, e.g., wavelengths in the 400 to mid-400 nm range, the system 100 is capable of recording capacities of around 2000 GB to around 3000 GB depending on the NA used with the system 100, with greater capacity achieved with higher NA, as shown in FIG. 12(a). Approximately 2000 GB may be accomplished with a NA of approximately 0.8 to 0.9, and approximately 3000 GB may be accomplished with a NA of approximately 1.2 to 1.3 NA. For comparison purposes, the storage capacity of a Blu-ray system is also shown on FIG. 12(a).

Figure 12B:
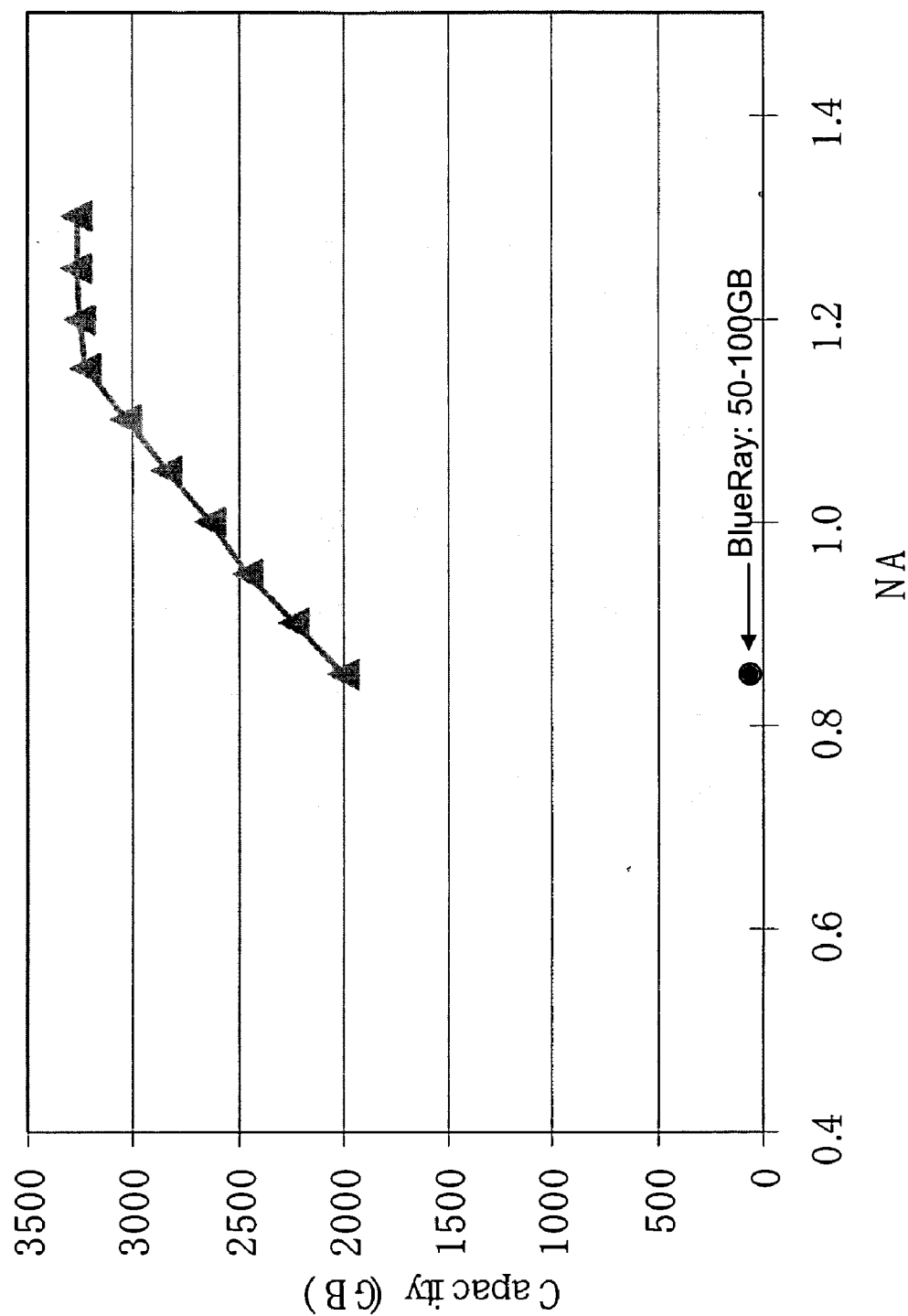
FIG. 12(b) is a graph illustrating the storage capacity of a system of the present invention in use with a recording medium having the multilayer structure of the present invention.

FIG. 12(b) illustrates the performance gains over current systems, such as, e.g., a Blu-ray system, when system 100 having a custom liquid interface singlet objective lens 110(a) is used in conjunction with a recording medium that incorporates multilayer structure 300. Using system 100 having a custom liquid interface singlet lens with a multilayer structure 300 recording medium results in a storage capacity of about 2000 GB at lower NA, e.g., around 0.8 to 0.9 NA, and a storage capacity of about 3250 GB at higher NA, e.g., around 1.2 to 1.3 NA. For comparison purposes, the storage capacity of a Blu-ray system is also indicated on FIG. 12(b).

Figure 12C:
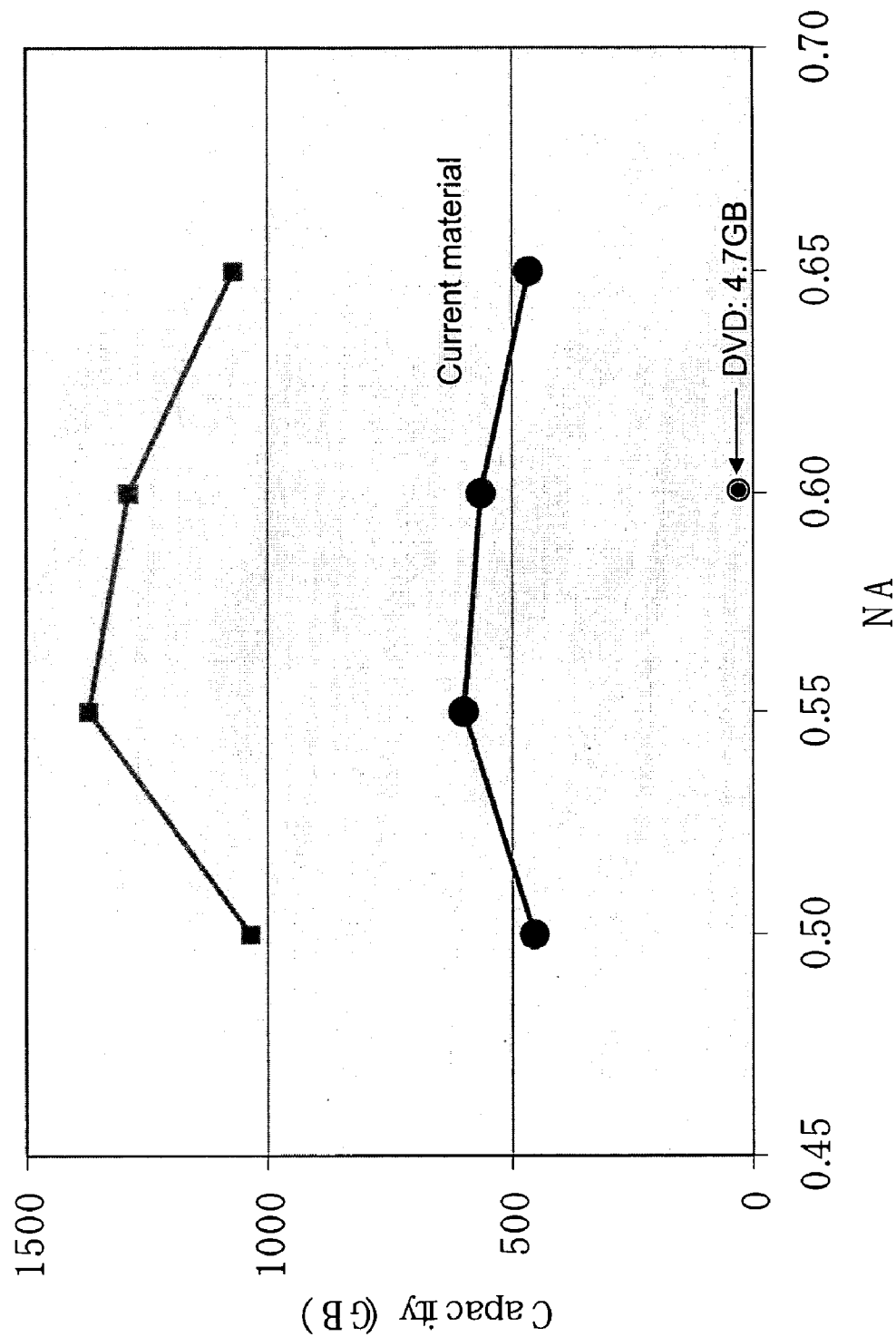
FIG. 12(c) is a graph showing the storage capacity achievable when the new material system of the present invention that uses shorter wavelengths, e.g., in the 400 to mid-400 nm range, is combined with the multilayer structure of the present invention.

FIG. 12(c) illustrates the storage capacity that may be achieved when using a recording medium that incorporates new material system that uses shorter wavelengths, e.g., in the 400 to mid-400 nm range, and multilayer structure 300. At a NA of approximately 0.50 about 1000 GB may be achieved, at a NA of 0.55 close to 1500 GB may be achieved, at a NA of 0.60 around 1250 GB may be achieved, and at a NA of 0.65 about 1000 GB may be achieved. For comparison purposes, the performance of prior art recording medium, i.e., a recording medium that records at mid-500 nm to mid-600 nm and having a uniform structure, and the performance of current DVD systems are also shown on FIG. 12(c).

Figure 12D:
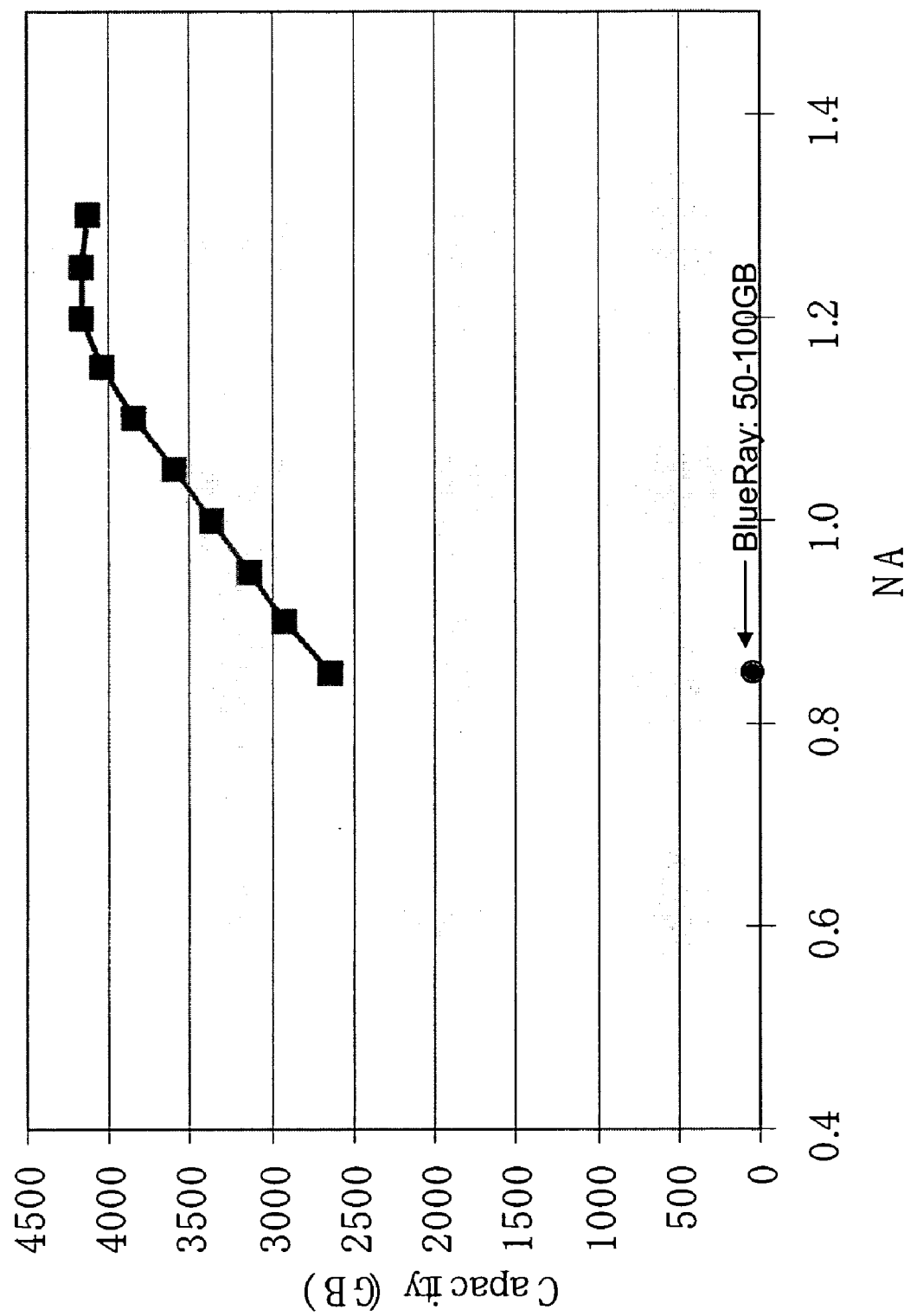
FIG. 12(d) illustrates the storage capacity of a system of the present invention in use with a recording medium that incorporates both the multilayer structure and the new material system that operates at shorter wavelengths.

For the maximum increase in storage capacity, system 100 having a custom liquid interface singlet objective lens 110(a) may be used with a recording medium 112 that incorporates both the new material system that operates at shorter wavelengths, e.g., in the 400 to mid-400 nm range, and the multilayer structure 300. As shown in FIG. 12(d), approximately 2500 GB may be achieved at a NA of around 0.8 to 0.9, and greater than 4000 GB may be achieved at a NA of around 1.2 to 1.3. For comparison purposes, the performance of a current Blu-ray system is also indicated on FIG. 12(d).

The numerical aperture influences not only the recorded bit size and the collected fluorescence, but also the recording power. For two-photon recording, the required peak power, $P_{peak}$, of the laser can be expressed as:

$$P_{peak}^2 = \frac{\pi^2 2h\nu h_{unit}(0.6\lambda)^4}{D_M \sigma T t_p f_{rep}} \frac{1}{NA^4} \qquad \text{Equation 5}$$

In Equation 5, hv is photon energy, $M_{unit}$ is recorded molecules per unit volume, λ is recording wavelength, $D_M$ is density of the original unrecorded molecules, σ is two-photon cross section, $t_p$ is the pulse width of recording laser, $f_{rep}$ is the repetition rate of recording laser, and T is recording time. Equation 5 may be rearranged to obtain the recording efficiency:

$$\eta = \left(\frac{M_{unit}}{D_M}\right) \qquad \text{Equation 6}$$

$$= \left(\frac{h\nu}{2}\right)\sigma\left(\frac{t_p f_{rep}}{f_{data}}\right)\left(\frac{N_P^2}{t_p^2}\right)\left(\frac{1}{A^2}\right)$$

$$\left(\frac{t_p p^\# \sigma}{2h\nu}\right)\left(\frac{P_{peak}}{A}\right)^2$$

Rearranging the equation once more, including the NA, energy, and photon arrival rate through results in the following equation:

$$\frac{1}{A^2} = \frac{NA^4}{\pi^2(0.61\lambda)^4}, \qquad E_T = E_p p^\# = N_p h\nu p^\# \qquad \text{Equation 7}$$

Rearranging the equation again gives:

$$\eta = \left(\frac{\sigma}{2h\nu}\right)E_p P_{peak} p^\# \left(\frac{NA^4}{\pi^2(0.61\lambda)^4}\right) \qquad \text{Equation 8}$$

Figures 13A, 13B:
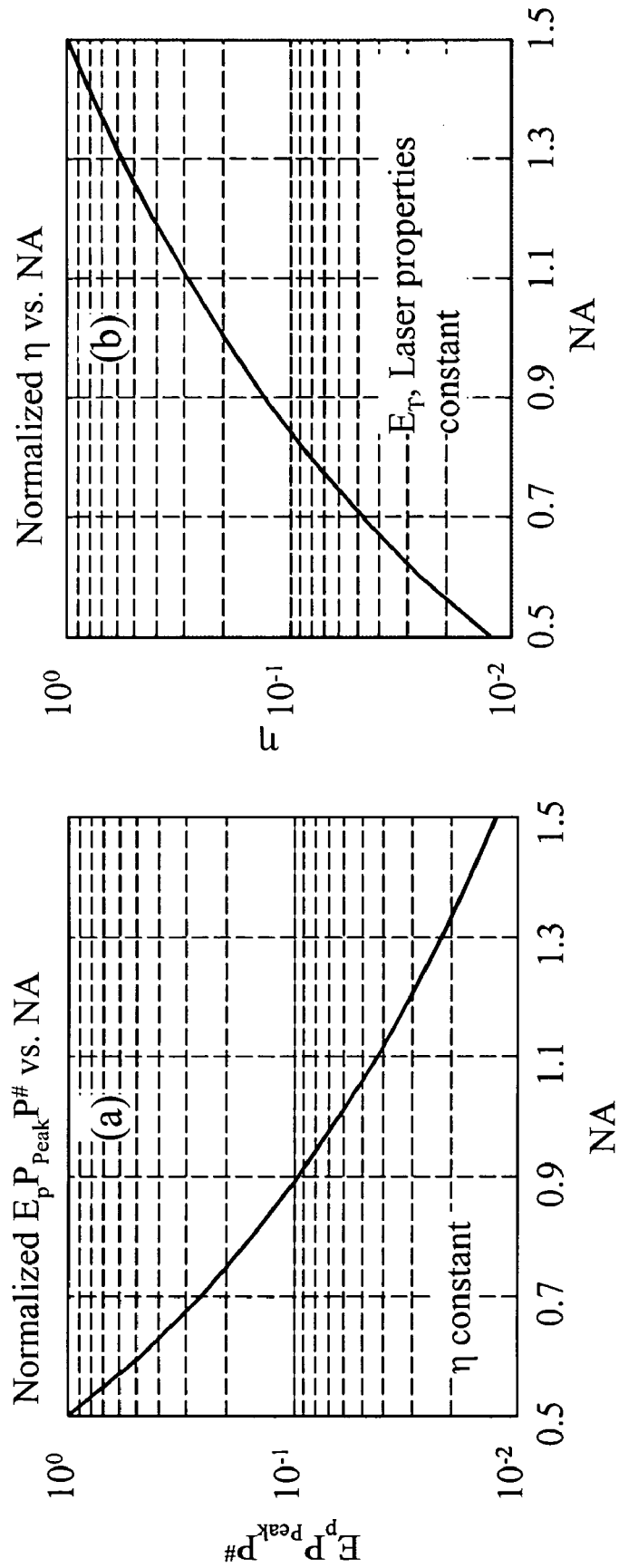
FIG. 13(a) shows NA dependency of recording laser properties with constant recording efficiency.
FIG. 13(b) shows NA dependency of recording efficiency (η) with constant recording laser properties.
Figure 14:
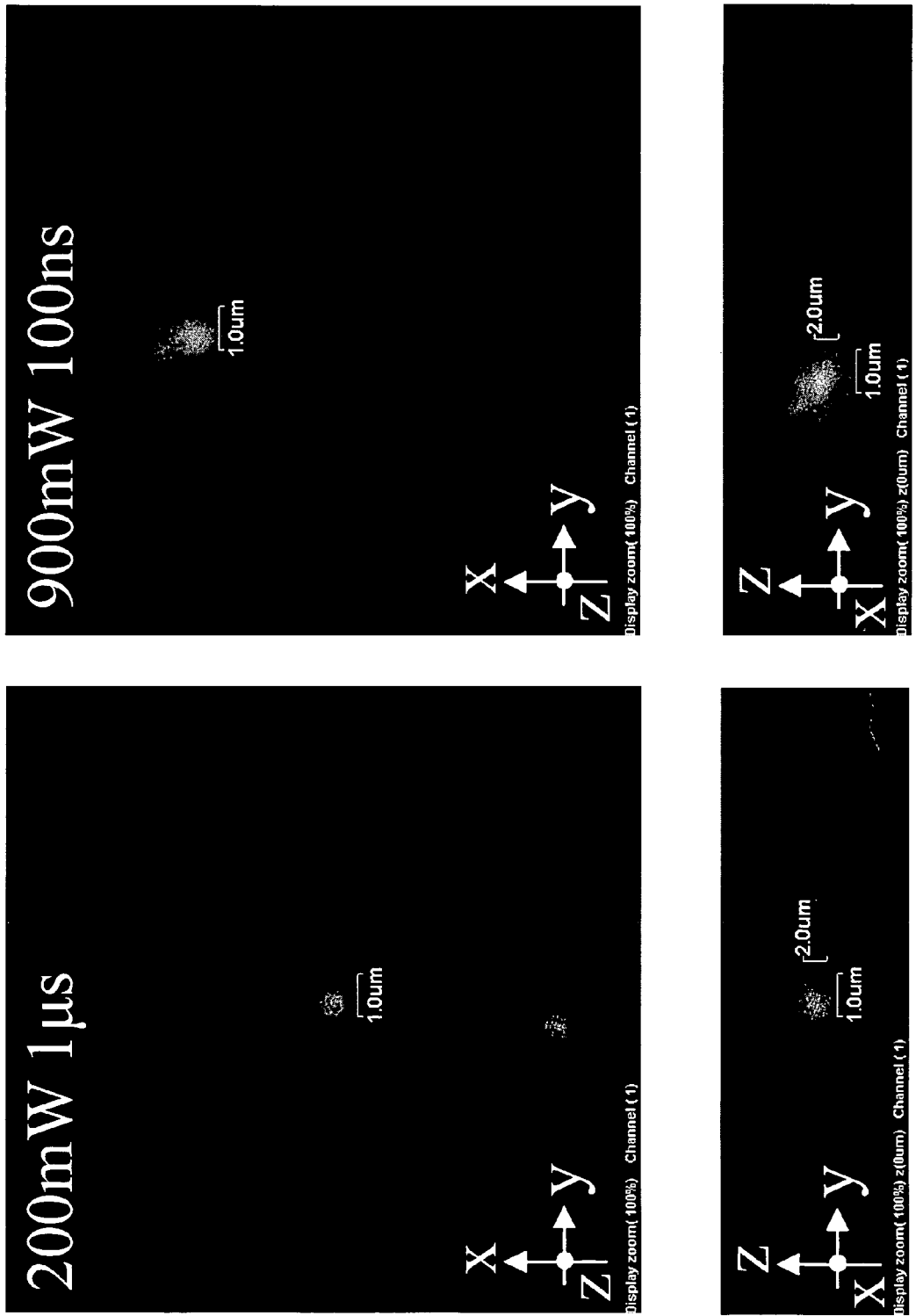
FIG. 14 illustrates experimental results showing fluorescent confocal microscope images of recorded data bits using a 1.4 NA oil immersion microscope objective lens for recording.

FIG. 13(a) plots recording laser parameters of total energy to record a data bit multiplied by the photon arrival rate, or peak power, vs NA for a constant recording efficiency, η. From FIG. 13(a), it is observed that the inverse $4^{th}$ order, $NA^{-4}$, dependence can dramatically reduce the recording laser requirements to achieve two-photon recording. FIG. 13(b) plots the recording efficiency, η, as a function of NA for constant energy and laser properties. The recording efficiency has a $4^{th}$ order, $NA^4$, dependence and is also proportional to the total energy and the photon arrival rate As an example, an Olympus MplanApo 100X/1.4 NA oil immersion objective lens is used to record data bits inside the volumetric photochromic media using two-photon absorption techniques. Experimentally, a 532 nm Nd:Vanadate laser, from HighQ Inc., having a pulse width 6.5 pSec and repetition rate of 76 MHz is used. With a 0.5 NA objective lens a 1 Mbit/s recording rate is achieved with average power of 1.5 W and peak power of 3 KW. FIG. 14 shows fluorescent confocal microscope images of recorded data bits using an Olympus 1.4 NA oil immersion microscope objective lens. Two conditions are investigated. The first condition is recording with 200 mW of average power (400 W peak power) and exposing for the same 1 Mbit/s data rate as that of the 0.5 NA optical system. The 200 mW average power recording at 1 Mbit/s results in a data bit size of 0.5×0.5×2 μm³ that agrees well with the 0.35×0.35×1 μm³ bit size that is expected. The 200 mW average recording power requirement at 1.4 NA is reduced by 5 times relative to 0.5 NA for the same 1 Mbit/s recording rate as expected. The next condition is recording with 900 mW of average power (2 kW peak power) and exposing for 100 ns or 10 Mbit/s data rate 10 times faster than that of the 0.5 NA optical system. The 900 mW average power recording at 10 Mbit/s results in a similar data bit size of 0.5×0.5×2 μm³ that agrees well with simulation theory. Alternatively, the recording rate is increased to 10 Mbit/s at 1.4 NA from 1 Mbit/s at 0.5 NA for similar average laser power of 1 W as expected. Also the number of pulses used to record a data bit at 10 Mbit/s is reduced to 7 pulses where 76 pulses are used at 1 Mbit/s.

Figures 15A, 15B, 15C, 15D:
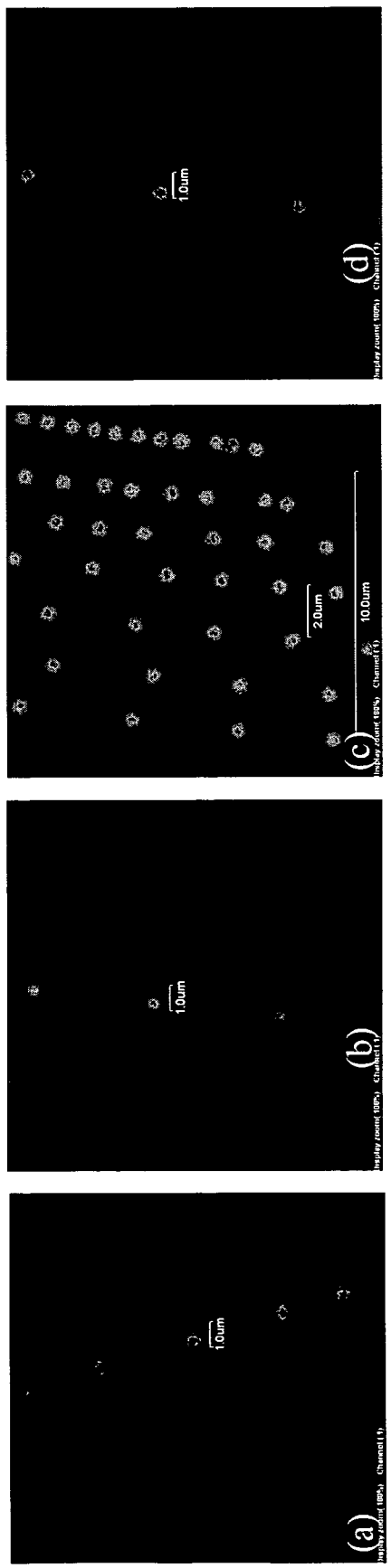
FIG. 15(a) illustrates experimental results of 1.4 NA objective lens recordings using Coherent Ti:Sapphire frequency doubled 460 nm, 210 W peak power, 250 fs pulse width, 76 MHz rep rate, 2 mW average power with 760000 pulses to record data bits.
FIG. 15(b) illustrates experimental results of 1.4 NA objective lens recordings using Sfim-ODS 532 nm, 75 W peak power, 500 ps pulse width, 5 kHz rep rate, 1 mW average power with 3 pulses to record data bits.
FIG. 15(c) illustrates experimental results of 1.4 NA objective lens recordings using HighQ Nd:Vanadate 532 nm, 200 W peak power, 6.5 ps pulse width, 76 MHz rep rate, 100 mW average power with 75 pulses to record data bits.
FIG. 15(d) illustrates experimental results of 1.4 NA objective lens recordings using Poly-Scientific 532 nm, 650 W peak power, 610 ps pulse width, 5 kHz rep rate, 2 mW average power with 1 pulse recording.

FIGS. 15(a)-(d) shows experimental results of 1.4 NA objective lens recordings with different laser systems. The Sfim-ODS and Poly Scientific 532 nm microchip lasers are very interesting in their package is a standard TO-3 can approximately 1 in³ while the Nd:Vanadate and the Ti:Saphire laser systems are non-standard briefcase size laser packages that require water cooling as opposed to air cooling. Currently, the small TO-3 package lasers do have a disadvantage in repetition rate which would limit recording data rates, but higher repetition rate small package laser system is expected in the future. The small package lasers were able to record with a single pulse, while the Nd:Vanadate laser could record in the range of 7-75 pulse depending upon the peak power, or equivalently the photon arrival rate. In FIG. 15(a) a frequency doubled Coherent Ti:Sapphire 460 nm, 210 W peak power, 250 fs pulse width, 75 MHz rep rate, 2 mW average power uses 760000 pulses to record data bits. In FIG. 15(b) an Sfim-ODS 532 nm, 75 W peak power, 500 ps pulse width, 5 kHz rep rate, 1 mW avg power uses 3 pulses to record a data bit. In FIG. 15(c) a HighQ Nd:Vanadate 532 nm, 200 W peak power, 6.5 ps pulse width, 76 MHz rep rate, 100 mW avg power uses 75 pulses to record a data bit. In FIG. 15(d) a Poly-Scientific 532 nm 650 W peak power, 610 ps pulse width, 5 kHz rep rate, 2 mW avg power uses 1 pulse recording to record a data bit. All of the recordings in FIGS. 15(a)-15(d) are of similar quality as observed with the Olympus fluorescent confocal scanning optical microscope.

Figure 16:
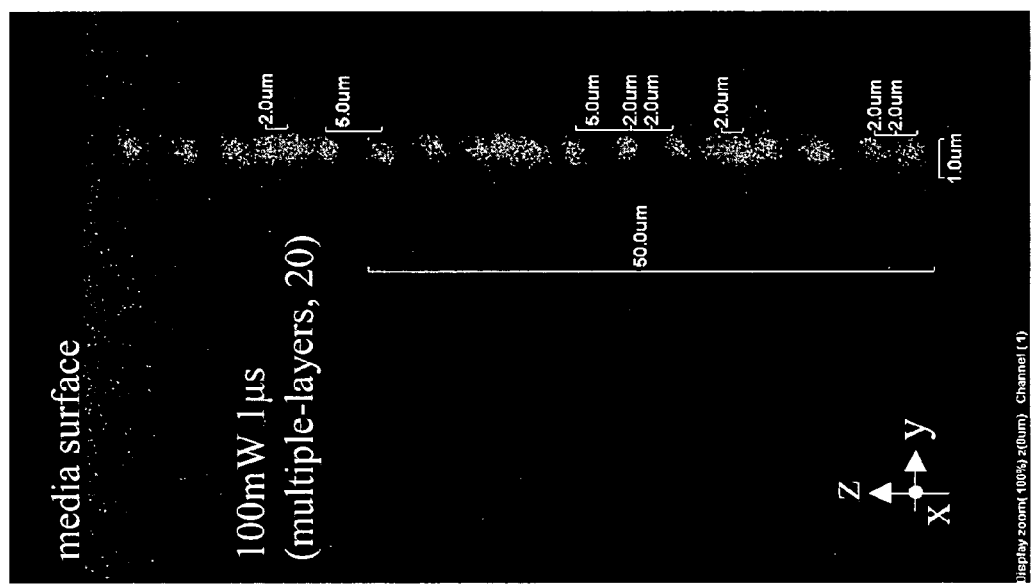
FIG. 16 illustrates experimental results showing fluorescent confocal microscope images of recorded data bits using a 1.4 NA oil immersion microscope objective lens across multiple layers that are recorded within 80 μm working distance.

The Olympus MplanApo 100X/1.4 NA oil immersion objective lens that may be used with the present invention has a working distance of 80 μm. Within this 80 μm multiple layers may be recorded if the depth of the bit is sufficiently small. Since the bit depth has been observed to be 2 μm it is possible to record as many as 20-30 layers within 80 μm of material. FIG. 16 illustrates experimental results showing fluorescent confocal microscope images of recorded data bits across multiple layers that are recorded within the 80 μm working distance of this particular lens at different layer spacing. The 4-5 μm layer separation shows good layer separation, and 2-3 μm layer separation shows poor layer separation, to minimize layer crosstalk. This indicates that for the bit size of 0.5×0.5×2 μm³ that 4-5 μm layer separation is practical to achieve 20 layers with this objective lens achieving ~50 bits/μm at a given radial location.

During readout, fluorescence is emitted in 4π steradians. The objective lens collects only a small portion of the fluorescence, as shown in FIG. 17(a). The substrate of the disk is PMMA, $n_1$=1.492, FIG. 17(b) shows the relationship of the collection angles in the interface of the disk and air. The critical angle affects the maximum solid angle that can be collected. Total collection efficiency is the ratio of the collected solid angle to 4π:

$$\eta_{Collection} = \left(1 - \sqrt{1 - \left(\frac{NA}{n_1}\right)^2}\right)/2 \qquad \text{Equation 9}$$

In Equation 9, $NA = n_2 \sin\theta_{lens}$ is the numerical aperture of the objective lens. FIG. 17(c) shows the collection efficiency for different NA. Here, we suppose the refractive index of media is 1.5 and recording with 532 nm laser. Objective lens with 0.5 NA through 1.5 NA is calculated. Total collected fluorescence is defined as:

$$F = \eta_{collection} V_{bit} \qquad \text{Equation 10}$$

In Equation 10, $V_{bit}$ is the recorded bit size. FIG. 17(d) shows the collected fluorescence vs. NA. The data is normalized with the data at 0.5 NA. After normalization, the relationship is approximately the same for 532 nm and 460 nm recording wavelengths. This analysis assumes the fluorescence emitted per unit volume is the same.

The inventors note that digital data storage systems are typically characterized by three main performance characteristics, capacity, access time, and data rates (recording and readout). Existing data storage devices do not achieve high performance in all these characteristics at once and at low cost. Accordingly, for this aspect of the present invention the inventors propose a low cost ultra high capacity (TB/disk) removable write once optical disk storage media that can be recorded and readout using low cost laser diodes within a system operating with very high data rates >300 Mbit/s, and fast access times ~200 ms. This particular system is ideally suited for security, and reconnaissance systems supporting high-speed data filtering, and content as well as index based data searching algorithms.

To realize high data rate readout, a parallel readout system may be used. The advantages of the system and method of this aspect of the present invention may be understood by comparing this aspect of the present invention with conventional CD and DVD storage systems. In conventional CD and DVD optical data storage systems the data channel is serial as shown in FIG. 18(a). In contrast, this aspect of the present invention utilizes parallel reading and recording methods to increase data throughput. One method of parallel reading/recording is to fan the readout beam into several beams through the use of a diffraction grating. This results in a linear 1×N array of focused spots oriented radially so that each individual focused spot reads out a different data track, as shown in FIG. 18(b), increasing the total data throughput by N times that of a single channel device. A disadvantage with this method is that there is a limit as to how large N can be due to the limited object field of the objective lens. Another method of parallel reading/recording using an arrangement of 1×N focused spots in a radial line is to arrange them in a two dimensional spot array as shown in FIG. 18(c). This method will not increase the data throughput but can reduce crosstalk and aid in matching the illuminated data tracks to a detector array. Employing a large number of laser beams using a lenslet array or a single high NA annular-field objective lens can generate a two dimensional spot array. An astigmatic line of illumination may also be used to read out 1×N multi-tracks. These architectures achieve parallel readout within a single layer.

The materials used for the disks of this aspect of the present invention result in recorded data layers that are non-reflective but emissive and can be recorded very closely together. Accordingly, the readout of the systems of this aspect of the present invention may also be accomplished by using a class of optical systems known as depth transfer optical ("DTO") systems. The DTO is an afocal relay telescope in a Keplerian configuration used as a 4f one-to-one imaging system. The afocal configuration has the desirable first order properties of constant lateral and longitudinal magnification. In comparison, typical CDs use a finite conjugate single element lens that does not possess the desirable properties of constant lateral and longitudinal magnification. DTO systems, in contrast, arrange the 2-D data page array tilted with respect to the optical axis so that multiple tracks (1×N) within multiple layers (M) are readout simultaneously. The data page format is organized with 1×N multiple tracks being read out at a given depth inside the material with M more layers being readout at the same radial location as shown in FIG. 18(d). This architecture offers much higher data rates compared to serial readout or in-plane parallel readout while using low cost lightweight lenses.

FIG. 19(a) illustrates the concept of 2-D data page array on a tilted plane with respect to the optical axis of the readout optics. FIG. 19(a) also indicates that collinear and non-collinear illuminations are two techniques for exciting the fluorescence of the recorded data page. Collinear and non-collinear illumination systems have been designed and built. The servo for the collinear illumination is simpler than non-collinear as the illumination and fluorescence share the same objective lens. A DTO system is used as the readout head to collect the excited fluorescence of a data page and image the collected fluorescence to a detector array. Each detector element within the array can be thought of as an individual serial data channel. During the rotation of the disk, data pages fan into the field of the optical system so that page-orientated parallel readout is achieved.

The inventors have operated and characterized a 64 parallel data channel readout system that reads 16 radial data tracks on 4 data layers in parallel from a two-photon recorded monolithic multilayer disk with a total data throughput of 64 Mbit/s. Crosstalk from adjacent tracks and adjacent layers has been shown to be 25-30 dB below the primary signal.

A fully operating scaled down disk drive and associated disk media that relies on 3D bit-wise recording is utilized to obtain the feasibility of the performance potentials derived in the above mentioned experiments. Preferably, this particular system uses a disk write-once-read-many (WORM) media optimized for multi layer 3D bit-wise recording. Currently known WORM media may have up to four layers, such as DVD, Blu-ray disks. The WORM media usable with this aspect of the present invention is, by comparison, a two-photon recordable photochromic doped polymeric WORM media capable of recording more than 100 layers with negligible interlayer crosstalk. The dimensions of the photochromic disk medium may be 3.5" diameter, 1 mm thick with a surface smoothness of 0.25 μm. The concentration of written form molecules may be increased by a factor of 3 to 5× compared to current disk media to compensate for smaller number of written molecules per bit. The media will support multiple layers of recording in a uniform 200 μm active medium using an objective lens with a working distance similar to the disk thickness of 200 μm. This media is preferably non-volatile, radiation resistant, and capable of operation between $-50°$ C. and $+50°$ C. without loss of information. In addition the media may be covered with a thin film to support liquid immersion lenses.

This system may incorporate a servo system for single channel readout. The servo system preferably follows a radial run-out of ~10 μm and axial runout of ~5 μm. A semiconductor laser is preferably incorporated into the system. Additionally, this system preferably includes a high NA optical head that will include active servo and data channels. This system will preferably include long working distance high NA lenses (NA raging between 0.85-1.4). The interface of the lens with the disk media may be with either liquid immersion or free space.

The system of this aspect of the present invention combines the high performance characteristics of high NA optics and multi-layer photochromic disk media that can be recorded by two-photon absorption. Two-photon recording enables the recording of data in multiple layers without interlayer crosstalk providing very high volumetric densities. Using a high NA lens the resulting data bit size is on the order of 0.3×0.3 μm and only 2 μm deep resulting in ultra high areal as well as volumetric data densities. Therefore in an active media that is ~200 μm thick 100 bits may be stored in a given radial location resulting in data densities exceeding >1 Tbit/in$^2$. The system of this aspect of the present invention delivers this level of performance on all the needed critical characteristics with inexpensive removable media and low cost off-the shelf optical system components including semiconductor lasers at data densities >1 Tbit/in$^2$.

The storage media usable with a system of this aspect of the present invention may be in the form of a 1-2 mm thick disk with an active light sensitive layer composed of optical memory materials. The memory materials are preferably sensitive to blue and green radiation via two-photon absorption in the 230-260 nm region of the spectrum. The material in its unwritten form is preferably colorless and transparent to visible light. When irradiated with an intense short pulse highly focused optical radiation at the blue-green spectrum, the light sensitive molecules in the medium preferably absorb two-photons simultaneously and undergo photochemical reactions that result in the formation of new molecular structure, written form, that is colored and has an intense absorption band around 630-650 nm. These written forms strongly fluoresce at 650-700 nm when appropriately excited with 630-650 nm radiation. Because the fluorescence quantum efficiency of the written form is very high, approaching 100%, the readout process requires very low optical power per bit (1 kW/bit for recording, 100 μW/bit for reading). Recording media formed from the new material system of the present invention may also be used with this particular system of the present invention. For example, the recording medium used with this embodiment of the system of the present invention may be formed from the following compound:

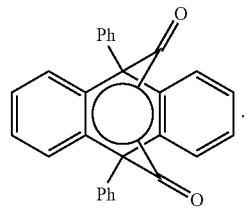

The stored bit density in the photochromic material may be limited by the properties of the recording optics, but may approach bit volumes of 0.2-0.5 μm$^3$ using high NA optics.

This high NA multi-layer system preferably implements active focus and tracking control for recording and readout. Standard CD/DVD/Blu-ray disk voice-coil actuators may be used to maintain radial and axial alignment of the focused spots while the disk is spinning. Focus control may be maintained within 0.5 μm and tracking will be within 0.1 μm at kHz servo loop bandwidths typical of currently available optical data storage systems.

Figure 20:
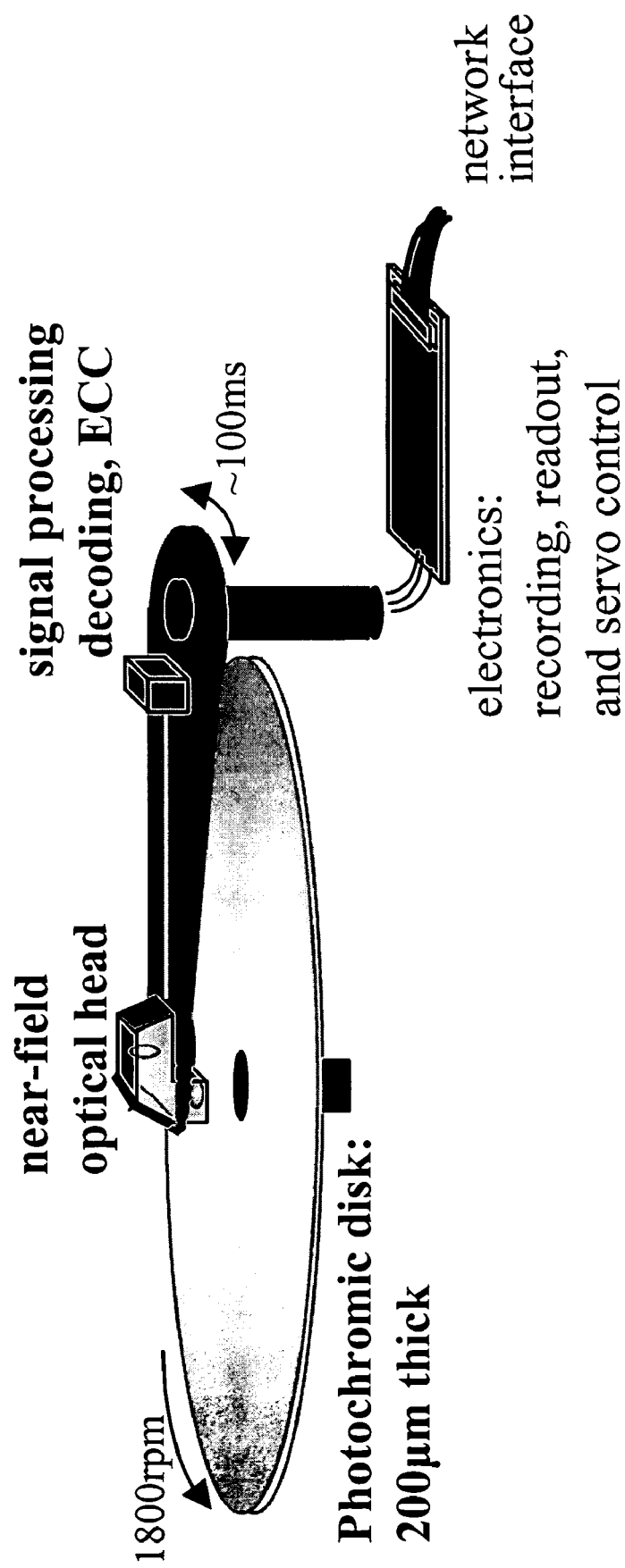
FIG. 20 illustrates a high NA multi-layer disk testbed.

A testbed illustrated in FIG. 20 may be provided to evaluate the performance of a system of this aspect of the present invention. The high NA multilayer disk testbed will be a table top dynamic reconfigurable spinstand that allows the flexibility to experiment with recording and readout components and architectures such as various, recording lasers, High NA objective lenses, and parallel optical systems to increase data throughput. For example, recording experiments may be performed on the testbed wherein the media is recorded using high NA optics, with recording lasers having picosecond pulsewidth, MHz repetition rate, kW-100's of Watt peak pulse power (~1 W average power) typical of recording lasers described herein. Several Olympus High NA objective lenses having an 80-280 μm working distance allowing multiple layer recordings may be used. Additionally, liquid interface singlet lenses such as the custom lens 110(*a*) described herein may also be used. Readout experiments may also be performed wherein the readout of the recorded marks is performed using fluorescence of written molecules excited by single photon absorption using a separate readout head with conventional 635 nm DVD laser diodes. The readout head will be similar to a depth transfer optical (DTO) system.

Operationally, a spot is written in the volume of a polymer matrix dispersed with photochromic molecules only at points of temporal and spatial intersection of two-photons with sufficient photon energies to record by altering the structure of the photochromic molecules. The recorded bits are read by fluorescence when excited by suitable optical radiation absorbed within the written spot volume.

Using this method, the disk media used by this aspect of the present invention may be recorded with as many as 100 layers having little crosstalk between layers and excellent stability of the written bits even under accelerated aging conditions. Raw bit-error-rates (BER) of $10^{-5}$ (same or better than conventional CD) have been demonstrated with the present invention. The broad reading and writing absorption spectra lead to large laser wavelength tolerances amenable to low cost high volume fabrication. The doped polymer media is low cost, flexibly shaped and molded, and its properties may be customized (by changing the dopant molecules) to match evolving application and technology requirements. Furthermore, this aspect of the present invention reduces the normally high peak intensities required for two-photon absorption recording, and eliminates the need for expensive and large laser sources, by using a decreased focused spot size obtained with high NA optics.

Any of the various embodiments and aspects of the systems, methods, and materials of the present invention that are disclosed herein may be used in combination with each other, where practicable and compatible, in order to increase the storage capacity of an optical storage system.

Though the invention has been described with respect to specific preferred embodiments, many variations and modifications will become apparent to those skilled in the art. It is therefore the intention and expectation that the appended claims be interpreted as broadly as possible in view of the prior art in order to include all such variations and modifications.

What is claimed is:

1. An optical storage system, comprising:
   an objective lens;
   a recording medium configured to receive recording beams and readout beams transmitted through the objective lens;
   a liquid gap coupling the objective lens and the recording medium, wherein the liquid gap maintains a continuous interface between the objective lens and the recording medium;
   a recording laser configured to transmit a recording beam through the objective lens and to the recording medium;
   a readout laser configured to transmit a readout beam through the objective lens and to the recording medium, wherein the recording medium emits fluorescence after contact with the readout beam; and
   a detector configured to receive fluorescence emitted from the recording medium.

2. The system of claim 1, wherein the liquid gap is composed of a liquid chosen from the group consisting of an index matching oil, a highly fluorinated organic composition, and water.

3. The system of claim 1, wherein the liquid gap has a refractive index that varies less than 0.01 from a refractive index of the recording medium.

4. The system of claim 1, wherein the objective lens comprises a liquid interface singlet lens.

5. The system of claim 1, wherein the recording medium comprises a material chosen from the group consisting of a polycarbonate, a fluorine-containing resin, a fluoropolymer resin, and polymethyl methacrylate.

6. The system of claim 1, wherein the objective lens comprises an attractive coating facing the liquid gap, and the recording medium comprises a repellent coating facing the liquid gap.

7. The system of claim 1, further comprising gas pressure applied to the liquid gap to maintain the continuous interface between the objective lens and the recording medium.

8. The system of claim 1, further comprising an optics holder disposed around the objective lens and in contact with the liquid gap, wherein the optics holder circulates the liquid comprising the liquid gap to maintain the continuous interface between the objective lens and the recording medium.

9. The system of claim 1, further comprising a transparent bag disposed between the objective lens and the recording medium, the transparent bag configured to hold the liquid comprising the liquid gap.

10. The system of claim 9, further comprising a lubricant layer on a surface of the recording medium in contact with the transparent bag.

11. The system of claim 1, further comprising an optics holder disposed around the objective lens and having a transducer in contact with the liquid gap.

12. The system of claim 1, further comprising an optics holder disposed around the objective lens and having an electrode in contact with the liquid gap.

13. The system of claim 1, wherein the continuous interface between the objective lens and the recording medium is maintained by applying microvibrations to the liquid gap.

14. The system of claim 1, wherein the recording medium responds to a readout beam of approximately 405 nm and a recording beam of approximately 460 nm.

15. The system of claim 1, wherein the recording medium responds to a readout beam and a recording beam of under 500 nm, and wherein the readout beam is a shorter wavelength than the recording beam.

16. The system of claim 1, wherein the recording medium emits fluorescence of approximately 430 nm in response to the readout beam.

17. The system of claim 1, wherein the recording medium has a photoreaction quantum yield of approximately 50%, a fluorescence quantum yield of approximately 100%, and a decomposition temperature of approximately 245° C.

18. The system of claim 1, wherein the recording medium comprises:
   a plurality of active layers capable of maintaining recorded data; and
   a plurality of buffer layers incapable of maintaining recorded data;
   wherein the active layers alternate with the buffer layers such that each active layer is disposed between two buffer layers.

19. An optical storage system, comprising:
   a liquid interface singlet objective lens;
   a recording medium configured for recording by recording beams of less than 500 nm and for readout by readout beams of less than 500 nm, the readout beams being of shorter wavelength than the recording beams, the recording medium comprising
      a plurality of active layers capable of maintaining recorded data, and
      a plurality of buffer layers incapable of maintaining recorded data,
      wherein the active layers alternate with the buffer layers such that each active layer is disposed between two buffer layers;
   a liquid gap configured to maintain a continuous interface between the objective lens and the recording medium;
   an optics holder disposed around the objective lens and in contact with the liquid gap;
   a recording laser configured to transmit a recording beam through the objective lens and to the recording medium;

a readout laser configured to transmit a readout beam through the objective lens and to the recording medium, wherein the recording medium emits fluorescence after contact with the readout beam; and a detector configured to receive fluorescence emitted from the recording medium.

20. The system of claim 19, further comprising:

a first collimate lens coupled to the recording laser and configured to transmit the recording beam to a dichroic beam splitter; and a first dichroic beam splitter coupled to the first collimate lens and configured to reflect the recording beam to the liquid interface singlet objective lens.

21. The system of claim 20, further comprising:

a first spherical aberration compensator coupled to the first collimate lens.

22. The system of claim 19, further comprising:

a second collimate lens coupled to the readout laser and configured to transmit the readout beam to a second dichroic beam splitter;

a second dichroic beam splitter coupled to the second collimate lens and configured to reflect the readout beam to the liquid interface singlet objective lens;

a diffractive optic element coupled to the second dichroic beam splitter and a second objective lens, wherein the diffractive optic element receives fluorescence emitted from the recording medium and passes the fluorescence to the second objective lens; and a second objective lens coupled to the diffractive optic element and the detector.

23. The system of claim 22, further comprising a confocal pinhole between the second objective lens and the detector and through which the second objective lens passes the fluorescence.

24. The system of claim 22, further comprising:

a second spherical aberration compensator coupled to the second collimate lens.

25. The system of claim 19, further comprising:

an attractive coating on a surface of the liquid interface singlet objective lens in contact with the liquid gap; and a repellent coating on a surface of the recording medium in contact with the liquid gap.

26. The system of claim 19, further comprising gas pressure applied to the liquid gap to maintain the continuous interface between the liquid interface singlet objective lens and the recording medium.

27. The system of claim 19, wherein the optics holder comprises a liquid return path and a liquid supply path configured to circulate the liquid gap to maintain the continuous interface between the objective lens and the recording medium.

28. The system of claim 19, wherein the optics holder comprises a plurality of transducers and the continuous interface between the liquid interface singlet objective lens and the recording medium is maintained by applying microvibrations to the liquid gap from the transducers.

29. The system of claim 19, wherein the optics holder comprises a plurality of electrodes.

30. The system of claim 19, wherein the readout beams have a wavelength of approximately 405 nm.

31. The system of claim 19, wherein the recording beams have a wavelength of approximately 460 nm.

32. The system of claim 19, wherein the readout beams have a wavelength of approximately 405 nm and the recording beams have a wavelength of approximately 460 nm.

* * * * *